US010774400B2

(12) United States Patent
Rothman et al.

(10) Patent No.: US 10,774,400 B2
(45) Date of Patent: Sep. 15, 2020

(54) OPPORTUNITIES FOR RECOVERY AUGMENTATION PROCESS AS APPLIED TO MOLYBDENUM PRODUCTION

(71) Applicant: CiDRA CORPORATE SERVICES LLC, Wallingford, CT (US)

(72) Inventors: Paul J. Rothman, Windsor, CT (US); Mark R. Fernald, Enfield, CT (US); Peter A. Amelunxen, Colebay (SX)

(73) Assignee: CiDRA Corporate Services LLC, Wallingford, CT (US)

(*) Notice: Subject to any disclaimer, the term of this patent is extended or adjusted under 35 U.S.C. 154(b) by 0 days.

(21) Appl. No.: 15/764,501

(22) PCT Filed: Oct. 17, 2016

(86) PCT No.: PCT/US2016/057334
§ 371 (c)(1),
(2) Date: Mar. 29, 2018

(87) PCT Pub. No.: WO2017/066756
PCT Pub. Date: Apr. 20, 2017

(65) Prior Publication Data
US 2018/0274060 A1 Sep. 27, 2018

Related U.S. Application Data

(60) Provisional application No. 62/242,521, filed on Oct. 16, 2015.

(51) Int. Cl.
*C22B 34/34* (2006.01)
*C22B 3/24* (2006.01)
(Continued)

(52) U.S. Cl.
CPC ............ *C22B 34/34* (2013.01); *B01D 21/283* (2013.01); *B01D 33/06* (2013.01); *C01G 39/003* (2013.01);
(Continued)

(58) Field of Classification Search
CPC ......... C22B 34/34; C22B 15/001; C22B 3/24; C01G 39/003
See application file for complete search history.

(56) References Cited

U.S. PATENT DOCUMENTS

| 4,549,959 A | 10/1985 | Armstrong et al. |
| 2014/0138324 A1* | 5/2014 | Rothman ............... B03B 1/04 210/748.02 |

(Continued)

FOREIGN PATENT DOCUMENTS

| CN | 102824954 A | 12/2012 |
| CN | 103128004 A | 6/2013 |

(Continued)

OTHER PUBLICATIONS

English language Abstract of CL2013003384A1—See WO2012162591A1.
(Continued)

*Primary Examiner* — Melissa S Swain
(74) *Attorney, Agent, or Firm* — Ware, Fressola, Maguire & Barber LLP

(57) ABSTRACT

A copper/molybdenum separation processor is provided featuring a slurry/media mixture stage configured to receive a conditioned pulp containing hydrophobic molybdenite and hydrophilic copper, iron and other minerals that is conditioned with sodium hydrosulfide together with an engineered polymeric hydrophobic media, and provide a slurry/media mixture; and a slurry/media separation stage configured to receive the slurry/media mixture, and provide a slurry prod- (Continued)

uct having a copper concentrate and a polymerized hydrophobic media product having a molybdenum concentrate that are separately directed for further processing. The slurry/media mixture stage include a molybdenum loading stage configured to contact the conditioned pulp with the engineered polymeric hydrophobic media in an agitated reaction chamber, and load the hydrophobic molybdenite on the engineered polymeric hydrophobic media.

39 Claims, 19 Drawing Sheets

(51) Int. Cl.
    *C22B 15/00*     (2006.01)
    *B01D 21/28*     (2006.01)
    *B01D 33/06*     (2006.01)
    *C01G 39/00*     (2006.01)
    *C01G 39/06*     (2006.01)
    *C22B 3/44*     (2006.01)

(52) U.S. Cl.
    CPC ............... *C01G 39/06* (2013.01); *C22B 3/24* (2013.01); *C22B 3/44* (2013.01); *C22B 15/001* (2013.01); *C22B 15/0023* (2013.01); *C22B 15/0089* (2013.01); *Y02P 10/234* (2015.11)

(56) References Cited

U.S. PATENT DOCUMENTS

| | | |
|---|---|---|
| 2014/0339172 A1 | 11/2014 | Rothman |
| 2015/0041368 A1* | 2/2015 | Kersey .................... B03D 1/02 |
| | | 208/390 |
| 2015/0083646 A1 | 3/2015 | Didden et al. |

FOREIGN PATENT DOCUMENTS

| | | |
|---|---|---|
| CN | 103521357 A | 1/2014 |
| CN | 103608079 A | 2/2014 |
| WO | 2012162591 A1 | 11/2012 |
| WO | 2013038192 A1 | 3/2013 |
| WO | 2013149231 A1 | 10/2013 |
| WO | 2014186352 A1 | 11/2014 |

OTHER PUBLICATIONS

English language Abstract of CL2014000614A1—See WO2013038192A1.
English language Abstract of CL2014002637A1—See WO2013149231A1.
Written Opinion issued Nov. 15, 2019 in Chilean counterpart application 201800962.
English language Abstract of CN102824954.
English language Abstract of CN103128004.
English language Abstract of CN103521357.
English language Abstract of CN103608079.

* cited by examiner

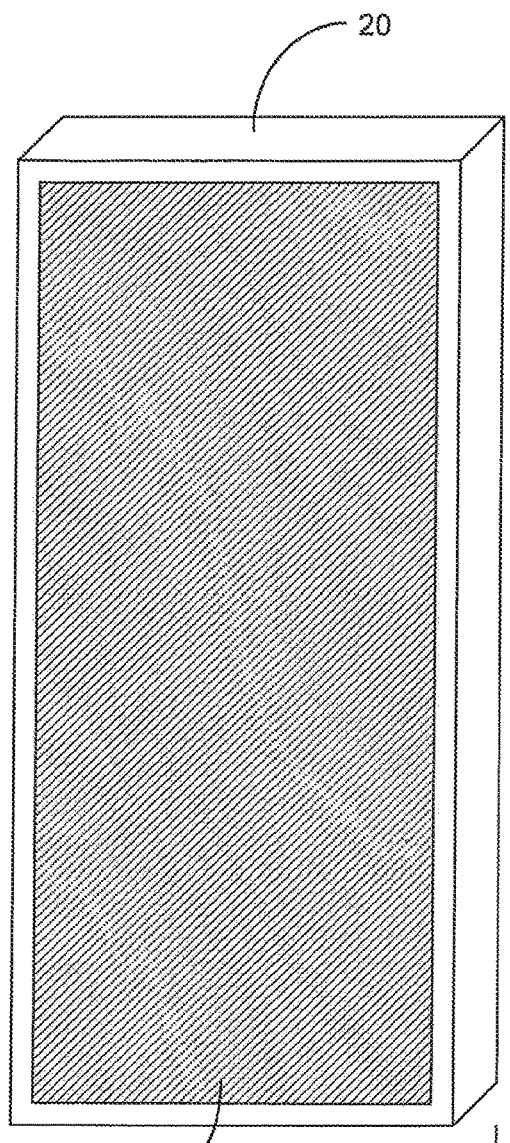
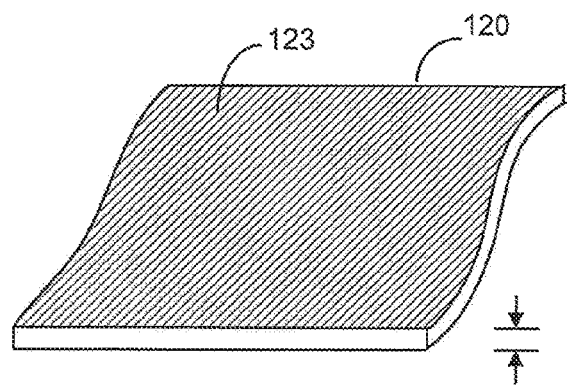
FIG.5
FIG. 4
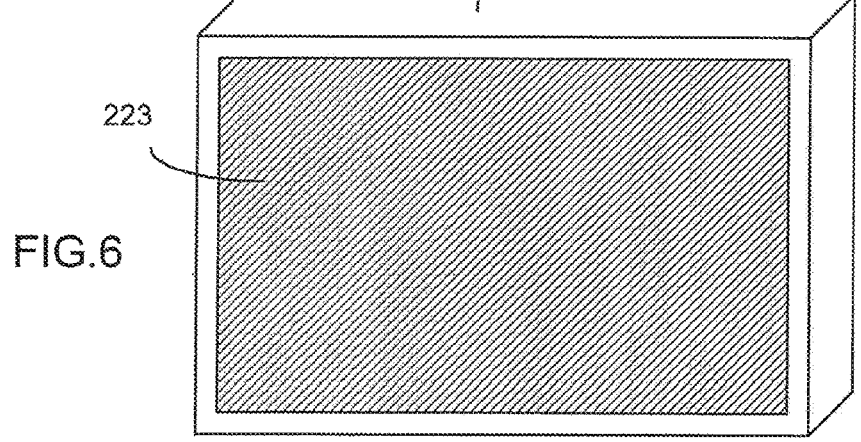
FIG.6

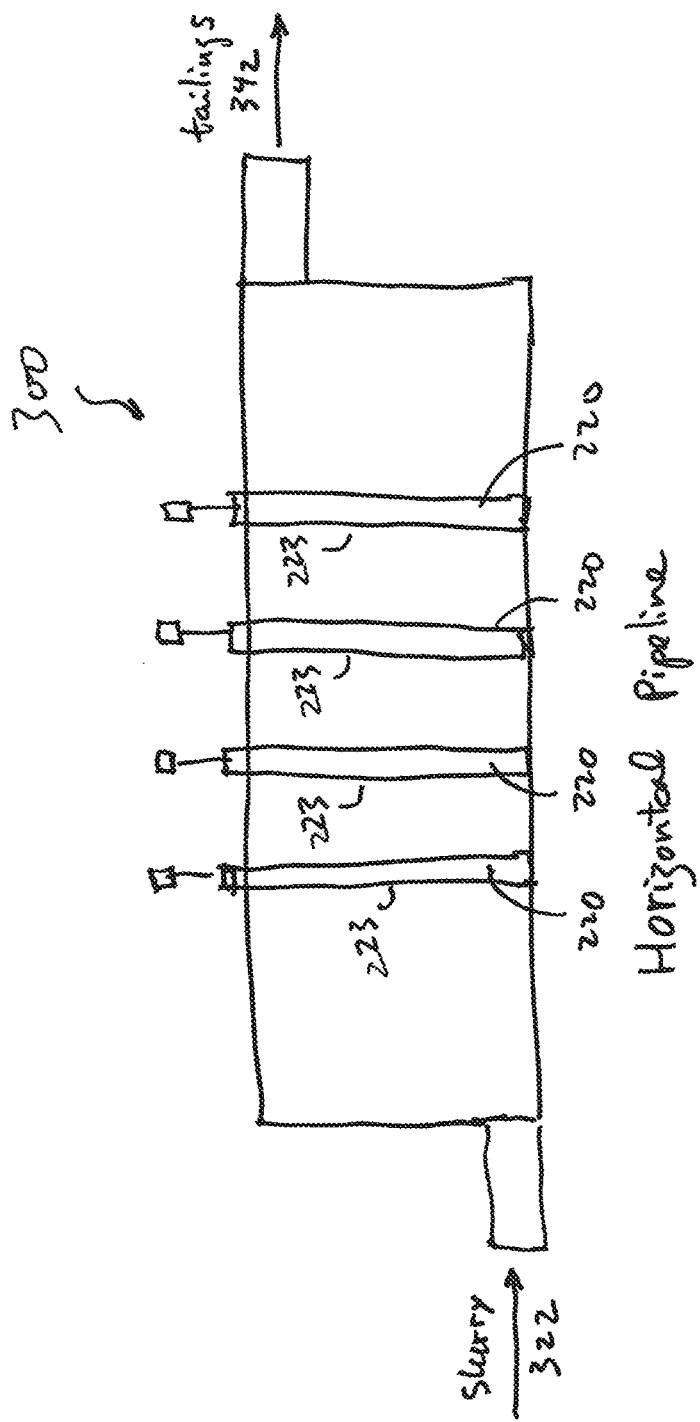

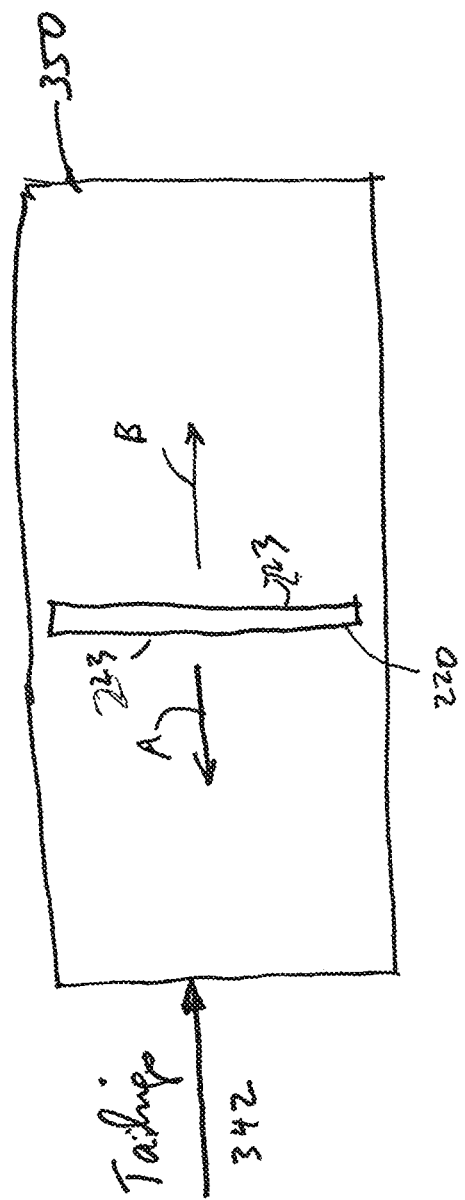

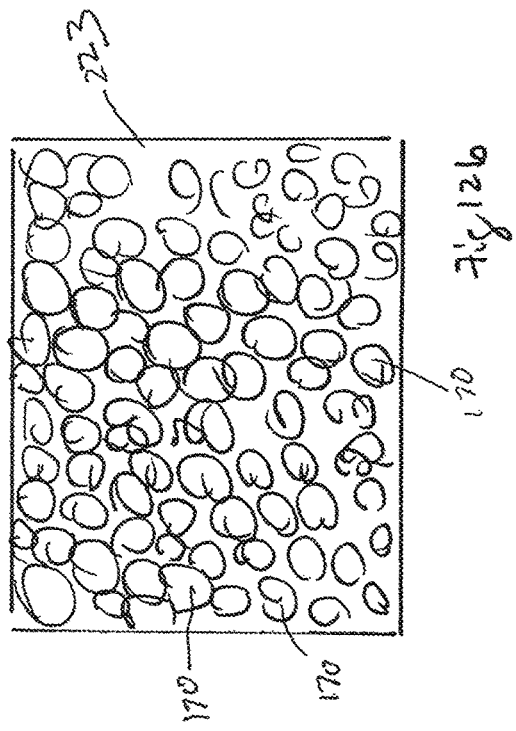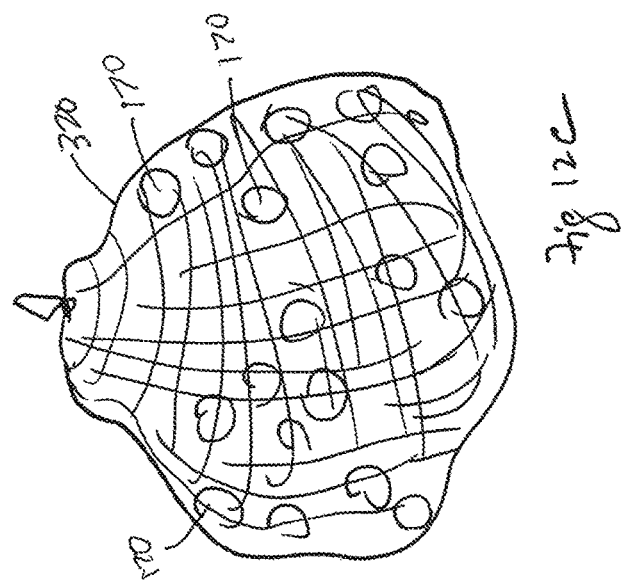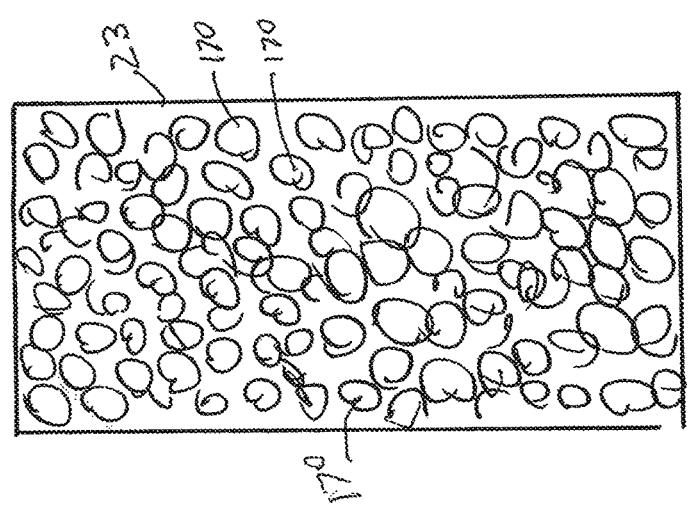

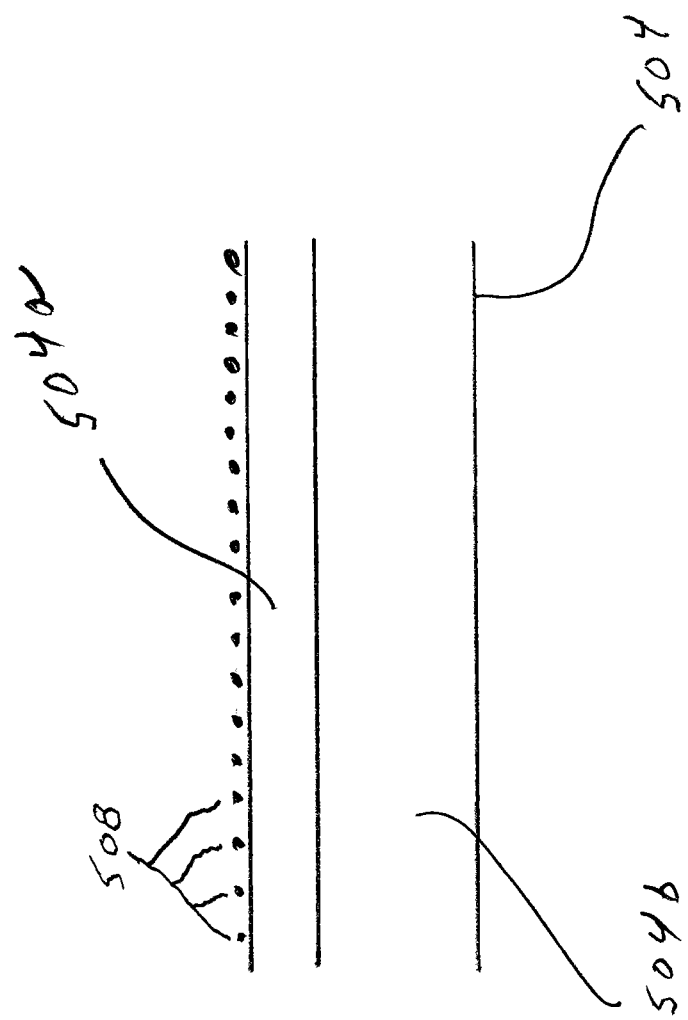

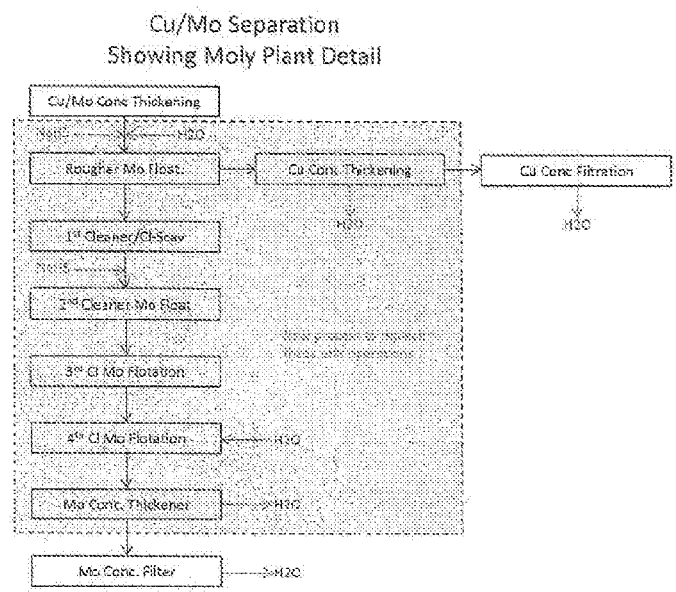
Figure 18B: Cu/Mo Separation Showing Moly Plant Details
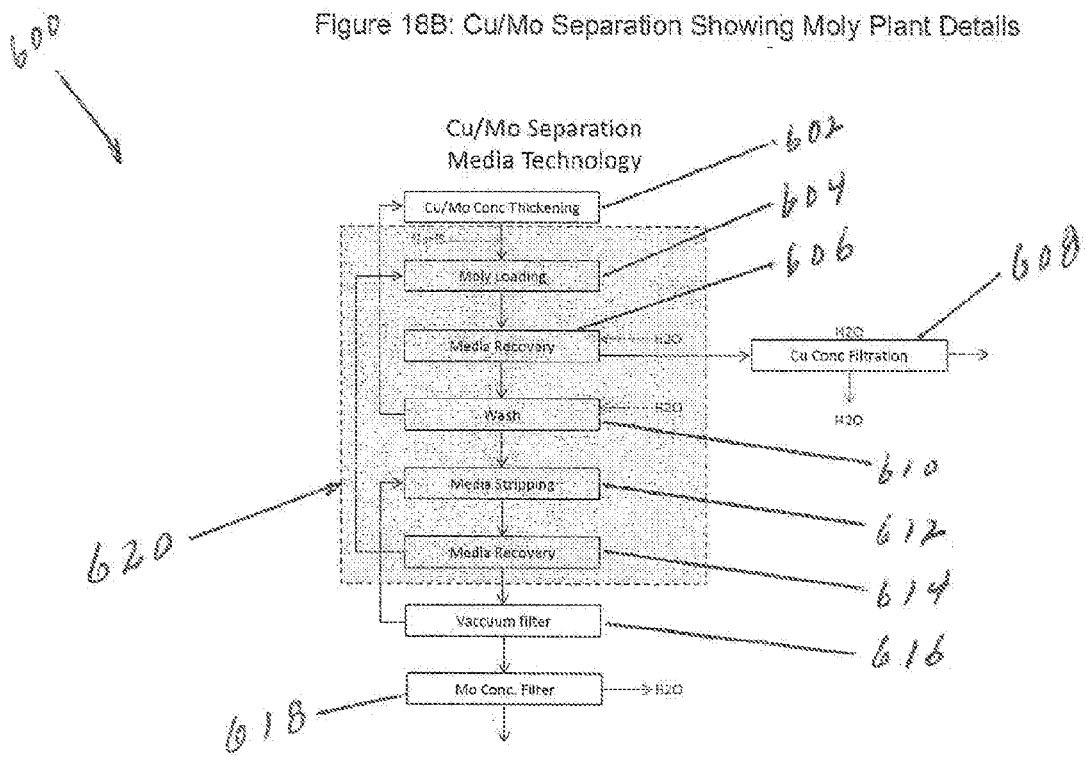
Figure 19A: Cu/Mo Separation Media Technology

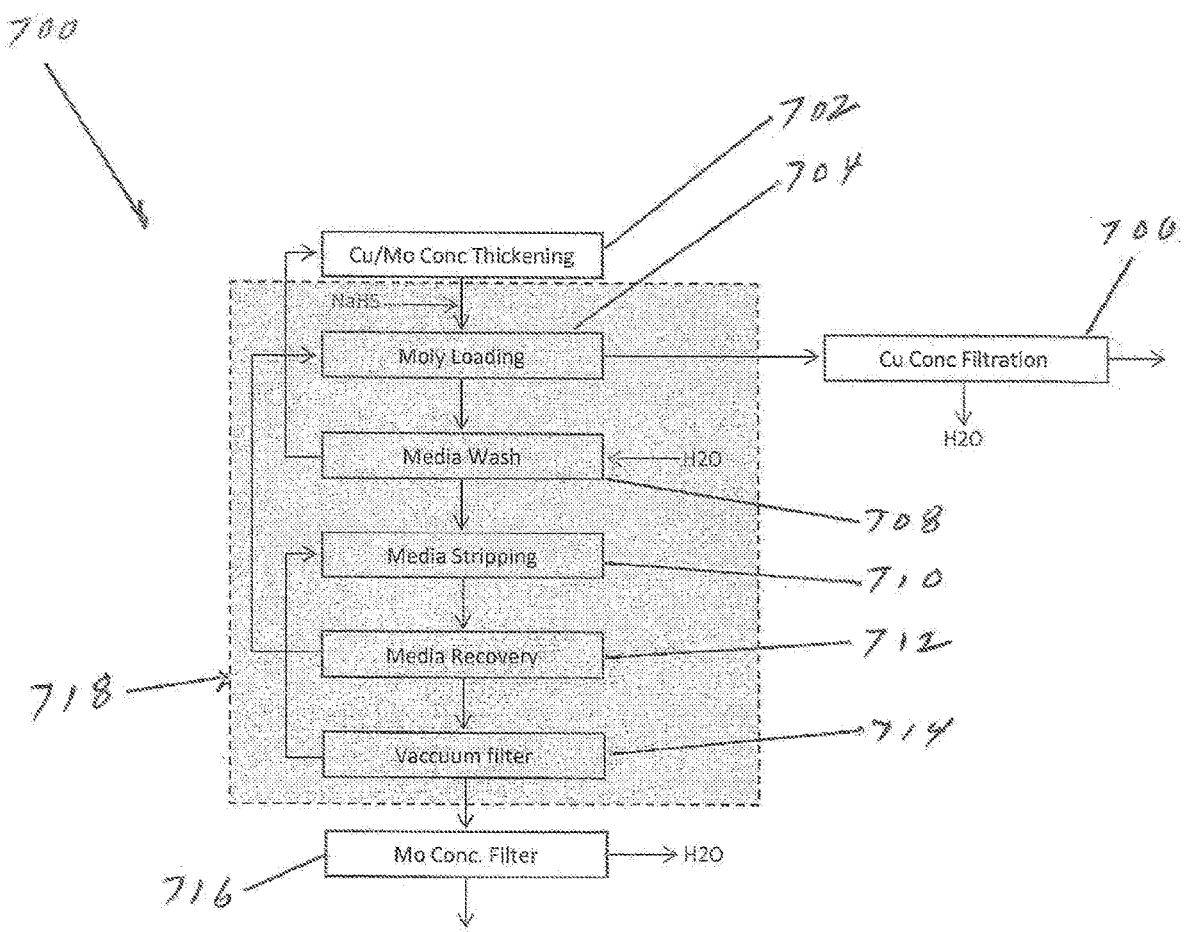
Figure 19B: Cu/Mo Separation Media Technology

OPPORTUNITIES FOR RECOVERY AUGMENTATION PROCESS AS APPLIED TO MOLYBDENUM PRODUCTION

CROSS-REFERENCE TO RELATED APPLICATION

This application claims benefit to provisional patent application Ser. No. 62/242,521, filed 16 Oct. 2015, which is hereby incorporated by reference in its entirety.

BACKGROUND OF THE INVENTION

1. Technical Field

This invention relates generally to a method and apparatus for separating valuable material in a mixture, such as a slurry mixture.

2. Brief Description of Related Art

Molybdenum Consumption and Usage

The global annual molybdenum consumption and production is currently estimated at around 530 million contained pounds of molybdenum (2014 figures), of which approximately 400 million are destined for the metallurgical industry (steel, stainless steel) and the other 130 million are sold in the chemical market (hydrodesulfurization catalyst, paints, lubricants).

Molybdenum is mined and concentrated in the form of a sulfide mineral called molybdenite, which must be converted to the oxide form before it can be used for chemical or steel production. This is done by "roasting" the concentrated molybdenite to create molybdic oxide ($MoO_3$) and sulfur dioxide gas ($SO_2$). The sulfur dioxide is captured in a scrubber and either neutralized with lime or converted to sulfuric acid (in the western hemisphere).

Molybdenite concentrates contain impurities which must be removed before the molybdenum can be used in the production of chemical and steel. Concentrates obtained as byproduct from copper mining have much higher levels of contaminants than those obtained from primary molybdenum mines. The most important impurity to control is copper, which is often present in by-product molybdenum concentrates due to hydraulic entrainment during the flotation process. The graph in FIG. 17 shows a comparison between selected byproduct concentrates and primary molybdenum mine concentrates.

Because the contaminant limits of molybdenum used for chemical production are more stringent than those for steel production, the concentrates from primary molybdenum mines, such as Henderson and Climax in the US, are generally reserved for chemical production while those from byproduct facilities are destined for the steel industry. Because the operating costs of primary molybdenum mines are often higher than the marginal cost of byproduct molybdenum, chemical-grade molybdic oxide can command a premium price over technical grade oxide (e.g., because byproduct molybdenum production is driven primarily by forces within the copper market, whereas primary molybdenum mine production is driven primarily by the demand for molybdenum oxide chemicals).

While the metallurgical market still consumes the majority of molybdenum production, the long term growth rate of the chemical grade molybdenum demand is approximately double that of the metallurgical demand (approximately 5% versus 2.5% per annum). The higher chemical market growth rate is attributed to the decreasing limits on allowable sulfur emissions in gasoline combined with the higher sulfur levels in crude petroleum (the majority of chemical grade molybdenum is used in for hydrodesulphurization catalyst).

Byproduct Molybdenum Concentrate Quality

Before molybdenum can be used for either chemicals or steels, the molybdenite must be oxidized in a roaster to form molybdic oxide. Roasters generally charge toll fees of anywhere between $0.20 and $0.40 per lb for toll roasting, $0.10 to $0.20 for FeCl3 leaching, and $0.05 to $0.10 for packaging, depending on market conditions. This amounts to from $0.35 to $0.70 toll fees, not including any added penalties for impurities.

Impurity limits depend on the roaster process and applicable environmental regulations; hence, they are usually roaster-specific. Table 1 shows some typical values for impurity limits. Penalties generally range from $0.05/lb of Mo for relatively clean concentrates with minor amounts of a single impurity to as high as $0.50/lb for lower grade concentrates that exceed all or almost all of the impurity level limits.

TABLE 1

Typical metallurgical grade impurity limits

| Impurity | No Penalties | Penalties | Rejected |
|---|---|---|---|
| Cu | <0.4% | 0.4% < 3% | >3% |
| Moisture + Oil | <6% | 6% < 9% | >9% |
| Pb | <0.04% | 0.04% < 0.1% | >0.1% |
| Cl | <500 ppm | 500 ppm < 2000 ppm | >2000 ppm |
| As | <200 ppm | 200 ppm < 1000 ppm | >1000 ppm |

By Product Moly Separation (FIGS. 18A and 18B)

Most copper sulfide concentrates are produced from low grade porphyry ore bodies using a series of crushing, grinding and flotation steps. The ore is first crushed and ground to achieve a consistently fine sandy texture (particle sizes up about 300 microns) and then subjected to a bulk "rougher" flotation step in which all of the sulfides are recovered, including any sulfide impurities such as pyrite. During this step a large portion of the original ore is rejected to tailings. The smaller mass of rougher concentrate is then subjected to further grinding (termed "regrinding") and lime and/or reagent collectors and depressants are added to depress the pyrite, gangue, and any other minerals or elements that are not desired in the final product. The amount of regrinding depends on the mineralogical properties of the minerals of interest.

During the cleaner flotation step, it is sought to recover the molybdenite to the sulfide concentrate and then remove it in a subsequent selective flotation step. The sulfide concentrate containing the copper and the molybdenum sulfide minerals is termed the "bulk sulfide concentrate" or "Cu/Mo concentrate". The subsequent selective flotation step, in which the molybdenite is floated and the copper sulfides are depressed, is termed "Cu/Mo separation" or just "molybdenum separation". The process consists of depressing the copper sulfide minerals by adding a depressant, almost always consisting of sodium hydrosulfide (NaHS) in solution, to reduce the oxidation-reduction potential of the pulp to extremely negative values, thus creating a reducing environment and rendering the copper sulfide minerals hydrophilic. It is beneficial to remove as much of the copper collectors from the slurry stream as possible, and this is done in a thickening (settling) step prior to addition of NaHS.

Because the copper sulfides and other minerals have been reground in the preceding steps, the particles are very fine and readily amenable to hydraulic entrainment. Hydraulic entrainment is the undesirable recovery of hydrophilic particles to the concentrate, due to the physical drag imparted by the water that is naturally recovered with the froth. Because of the large degree of entrainment in copper/moly separation, a second "cleaning" circuit is required to treat the moly rougher concentrate, in order for these entrainment impurities to be removed from the molybdenum concentrate.

The process as described above, although it is in use to produce more than 75% of the world's molybdenum recovery, has several disadvantages or inefficiencies that render the process less than ideal. These disadvantages or inefficiencies include the following:

1. The process water from the bulk circuit is removed prior to copper/molybdenum separation, in order to reduce the concentration of copper collectors and other reagents in the molybdenum separation process. This water must be replaced in order to achieve the optimal pulp densities for bubble disengagement in the subsequent molybdenum flotation step. As a result, a second, redundant copper concentrate thickener is required to remove the added water prior to filtration of the copper concentrate. A much more efficient process would be one that does not require lower density pulps in order to achieve an efficient molybdenum separation.

2. The hydraulic entrainment of undesirable fine particles necessitates a subsequent cleaning section that must consist of multiple stages of flotation, each one requiring dedicated instrumentation, pumps, and infrastructure.

3. The use of air in the molybdenum flotation process is detrimental. The oxygen in the air oxidizes the dissolved NaHS, producing sodium hydroxide in solution. The sodium hydroxide causes the pH to increase, resulting in slower molybdenum kinetics, higher circulating loads, and, in general, a larger separation process due the inefficiency of operating at higher pH. Indeed, many operations have taken to using nitrogen instead of air to produce the flotation, and some have installed acid and/or $CO_2$-based pH control mechanisms. These processes are costly and can create safety hazards. Clearly, a separation process that does not require the use of air or pH control would be much more cost efficient, easier to operate, and probably much safer as well.

4. The presence of a froth phase at the top of the cell complicates the process. Bubble coalescence and drainage from the froth significantly dampens the overall speed of flotation, requiring larger cells to achieve the same degree of recoveries. Furthermore, the materials handling steps associated with pumping tenacious froth can be difficult to design and control, leading to spillage, process inefficiencies, and material losses. Specially-designed froth pumps, defrothing sumps, and the use of defoamers are often employed in order to improve the materials handling efficiency. A froth-free molybdenum recovery circuit would advantageous from a materials handling perspective as well.

On a fundamental level, all of the previous inefficiencies can be summarized succinctly as follows: "The problem with the prior art of molybdenum flotation is that it requires the use of air."

SUMMARY OF THE INVENTION

According to some embodiments of the present invention, the present invention may take the form of a copper/molybdenum separation processor featuring a slurry/media mixture stage and a slurry/media separation stage.

The slurry/media mixture stage may be configured to receive a conditioned pulp containing hydrophobic molybdenite and hydrophilic copper, iron, and other minerals that is conditioned with sodium hydrosulfide together with an engineered polymeric hydrophobic media loaded with hydrophobic molybdenum, and provide a slurry/media mixture.

By way of example, the engineered polymeric hydrophobic media may include, or take the form of, engineered polymeric bubbles/beads.

The slurry/media separation stage may be configured to receive the slurry/media mixture, and provide a slurry product having a copper concentrate and a polymerized hydrophobic media product having a molybdenum concentrate that are separately directed for further processing.

The copper/molybdenum separation processor may include one or more of the following features:

The slurry/media mixture stage may include a molybdenite loading stage configured to contact the conditioned pulp with the engineered polymeric hydrophobic media, e.g. in an agitated reaction chamber, and load the hydrophobic molybdenite on the engineered polymeric hydrophobic media. By way of example, the agitated reaction chamber may include, or take the form of, a tumbler-style reaction chamber, as well as a mechanical, rotating/tumbling, gravity flow, chemical, pneumatic, centrifugal reaction chamber, etc.

The slurry/media separation stage may include a media recovery stage, e.g., having or consisting of a vibrating screen, rotating trommel, or other separation device, configured to filter, separate and direct the slurry product having a copper concentrate to a copper concentrate filtration stage and the polymerized hydrophobic media product to a wash stage.

The copper/molybdenum separation processor may include the media wash stage, e.g., including a vibrating screen or trommel equipped with wash water sprays, configured to clean the polymerized hydrophobic media product, eliminate entrainment of hydrophilic particles, and provide washed engineered polymeric hydrophobic media.

The media wash stage may be configured to advance the washed engineered polymeric hydrophobic media to a media stripping stage, and return a wash solution, containing any residual hydrophilic particles, to a Cu/Mo thickening stage that forms part of the slurry/media mixture stage.

The copper/molybdenum separation processor may include the media stripping stage configured to receive the washed engineered polymeric hydrophobic media, remove loaded hydrophobic minerals from the washed engineered polymeric hydrophobic media using a strip solution or surfactant, and provide washed and stripped engineered polymeric hydrophobic media.

The copper/molybdenum separation processor may include a second media recovery stage, e.g., that may consisting of a screen or trommel, configured to
receive the washed and stripped engineered polymeric hydrophobic media in the form of a slurried mixture of stripped media, recovered hydrophobic particles and residual strip solution,
recycle recovered, washed and stripped engineered polymeric hydrophobic media to a molybdenite loading stage that forms part of the slurry/media mixture stage,
filter and direct residual slurry having the molybdenum concentrate to a moly filtration stage; and
recycle recovered stripping solution to the stripping stage.

The copper/molybdenum separation processor may include the moly filtration stage configured to receive the molybdenum concentrate and provide filtered molybdenum concentrate The copper/molybdenum separation processor may include the copper concentrate filtration stage configured to receive the slurry product and provide a filtered slurry product having a filtered copper concentrate.

The conditioned pulp is formed in part from a pulp that is thickened by a copper/molybdenite concentrate thickening stage configured upstream copper/molybdenum separation processor.

According to some embodiments, the slurry/media mixture stage may also include a molybdenite loading stage configured to contact the conditioned pulp with the engineered polymeric hydrophobic media, including in an agitated reaction chamber, load the hydrophobic molybdenite on the engineered polymeric hydrophobic media, direct the slurry product to a copper concentrate filtration stage and direct remaining loaded engineered polymeric hydrophobic media in the slurry/media mixture to a media wash stage.

The copper/molybdenum separation processor may include the media wash stage, including a wash stage vibrating screen or trommel equipped with wash water sprays, configured to clean the remaining loaded engineered polymeric hydrophobic media, eliminate entrainment of hydrophilic particles, and provide washed engineered polymeric hydrophobic media.

The media wash stage may be configured to advance the washed engineered polymeric hydrophobic media to a media stripping stage, and return a wash solution, containing any residual hydrophilic particles, to a Cu/Mo thickening stage that forms part of the slurry/media mixture stage.

The copper/molybdenum separation processor may include a media stripping stage configured to receive the washed engineered polymeric hydrophobic media, remove loaded hydrophobic minerals from the washed engineered polymeric hydrophobic media using a strip solution or surfactant, and provide washed and stripped engineered polymeric hydrophobic media.

The copper/molybdenum separation processor may include a media recovery stage consisting of a screen or trommel configured to receive the washed and stripped engineered polymeric hydrophobic media in the form of a slurried mixture of stripped media, recovered hydrophobic particles and residual strip solution, recycle recovered, washed and stripped engineered polymeric hydrophobic media to the molybdenite loading stage, filter and direct residual slurry having the molybdenum concentrate to the moly filtration stage; and recycle recovered stripping solution to the stripping stage.

The copper/molybdenum separation processor may include the moly filtration stage configured to receive the molybdenum concentrate and provide filtered molybdenum concentrate The copper/molybdenum separation processor may include the copper concentrate filtration stage configured to receive the slurry product and provide a filtered slurry product having a filtered copper concentrate.

Embodiments are also envisioned, wherein the slurry may be copper/molybdenum bulk concentrate that is partially upgraded and/or subjected to additional grinding and/or other comminution steps prior to treatment in the separation processor.

Alternatively, in a high density separation process to eliminate the redundant copper concentrate thickener, the thickened slurry and media mixture may occur without the addition of dilution water, and the resulting tailings, consisting of the primary copper- and iron sulfide concentrates, may thereafter be directed to a filtration stage without the need for further slurry thickening stages."

The Engineered Polymeric Hydrophobic Media

By way of example, the engineered polymeric hydrophobic media may include, or take the form of, engineered polymeric beads/bubbles made from a synthetic material, e.g., having plurality of molecules with a siloxane functional group configured to attract the mineral particles of interest, including a molybdenum concentrate.

Alternatively, the synthetic material may include a coating with the plurality of molecules with the siloxane functional group configured to attract the mineral particles of interest, including a molybdenum concentrate.

By way of example, the coating may include a silicone gel that includes, or takes the form of, molecules having the siloxane functional group, including a siloxane that is, or takes the form of, a functional group in organosilicon chemistry with the Si—O—Si linkage.

Parent siloxanes may include, or take the form of, oligomeric and polymeric hydrides with the formulae $H(OSiH_2)_nOH$ and $(OSiH_2)_n$.

The siloxane may include branched compounds, where the defining feature includes each pair of silicon centers being separated by one oxygen atom.

The silicone gel may take the form of a product sold in a combination that includes 3-4222 Dielectric Firm Gel Part A and 3-4222 Dielectric Firm Gel Part B.

The silicon gel may come with two parts, including:

Part A that includes dimethyl siloxane, dimethylvinyl-terminated—68083-19-2; polydimethylsiloxane—63148-62-9; reaction of ethylene glycol and silica—170424-65-4; hydrotreated light naphthenic petroleum distillate—64742-53-6; and Part B that includes dimethyl siloxane, dimethylvinyl-terminated—68083-19-2; polydimethylsiloxane—63148-62-9; dimethyl siloxane, hydrogen-terminated—none; trimethylated silica—68909-20-6; dimethyl, methylhydrogen siloxane—68037-59-2.

The coating may be configured or made substantially of a material that consists of a siloxane-based material in a non-gel form.

The coating may be functionalized to be hydrophobic so as to provide a bonding between the coating and the mineral particle of interest.

The engineered polymeric hydrophobic media may include, or take the form of, engineered polymeric beads/bubbles, e.g., having surfaces made of a polymer and coated with a silicone gel to provide the siloxane functional group.

The polymer may be naturally hydrophobic or functionalized to be hydrophobic.

The polymer may be a hydrophobic polymer, including a polydimethylsiloxane.

The surfaces may be rendered hydrophobic by having chemicals with a siloxane functional group.

The coating may be coated with hydrophobic silicone polymer including polysiloxane so as to become hydrophobic.

The coating may include polymer surfaces and the synthetic material comprise a siloxane derivative.

The synthetic material may include polysiloxanes.

The synthetic material may include one or more of dimethyl siloxane, dimethylvinyl-terminated; polydimethylsiloxane; and dimethyl, methylhydrogen siloxane.

The synthetic material may include hydroxyl-terminated polydimethylsiloxanes.

The polymer surfaces may include polyurethane.

The coating may include a polymer selected from a group consisting of polyamides, polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane.

The coating may include a polymer from a group consisting of polystyrene, poly(d,l-lactide), poly(dimethylsiloxane), polypropylene, polyacrylic, polyethylene, hydrophobically-modified ethyl hydroxyethyl cellulose polysiloxanes, alkylsilane and fluoroalkylsilane.

The Method

According to some embodiments, the present invention may include a method for separating copper and molybdenum, featuring steps for
receiving in a slurry/media mixture stage a conditioned pulp containing hydrophobic molybdenite and hydrophilic copper, iron and other sulfide minerals that is conditioned with sodium hydrosulfide together with an engineered polymeric hydrophobic media, e.g. having engineered polymeric beads/bubbles, and providing a slurry/media mixture; and
receiving in a slurry/media separation stage the slurry/media mixture, and providing a slurry product having a copper concentrate and a polymerized hydrophobic media product having a molybdenum concentrate that are separately directed for further processing.

The method may also include one or more of the features set forth above.

BRIEF DESCRIPTION OF THE DRAWING

Referring now to the drawing, which is not necessarily drawn to scale, the foregoing and other features and advantages of the present invention will be more fully understood from the following detailed description of illustrative embodiments, taken in conjunction with the accompanying drawing in which like elements are numbered alike:

FIG. 4 is an illustration of an impeller according to some embodiments of the present invention.

FIG. 5 is an illustration of a section of a conveyor belt according to some embodiments of the present invention.

FIG. 6 is an illustration of a filter according to some embodiments of the present invention.

FIG. 10a illustrates a plurality of filters placed in a horizontal pipeline to collect mineral particles, according to some embodiments of the present invention.

FIG. 11 is a diagram showing a filter placed in a tailings pond to collect valuable material according to some embodiments of the present invention.

FIG. 12a illustrates an impeller using a plurality of synthetic beads or bubbles for collecting valuable material, according to some embodiments of the present invention.

FIG. 12b illustrates a filter using a plurality of synthetic beads or bubbles for collecting valuable material, according to some embodiments of the present invention.

FIG. 12c illustrates a sack of synthetic beads which can be used as a filter to collect valuable material in a tailings pond, for example, according to some embodiments of the present invention.

FIG. 16b shows an exploded or enlarged diagram of a part of the conveyor belt shown in FIG. 16a, according to some embodiments of the present invention.

FIG. 18B shows current Cu/Mo separation showing moly plant details that is known in the art, which contains a series of stages in a shaded area, for which a new process according to the present invention set forth herein will be implemented to replace these unit operations.

FIG. 19A shows a Cu/Mo separation media technology according to some embodiment of the present invention, which indicates corresponding stages in a corresponding shaded area, showing the new process to replace the aforementioned unit operations in the prior art process shown in FIGS. 18A and 18B.

FIG. 19B shows a Cu/Mo separation media technology according to some embodiment of the present invention, which indicates corresponding stages in a corresponding shaded area, showing the new process to replace the aforementioned unit operations in the prior art process shown in FIGS. 18A and 18B.

DETAILED DESCRIPTION OF THE BEST MODE OF THE INVENTION

Figure 18A:
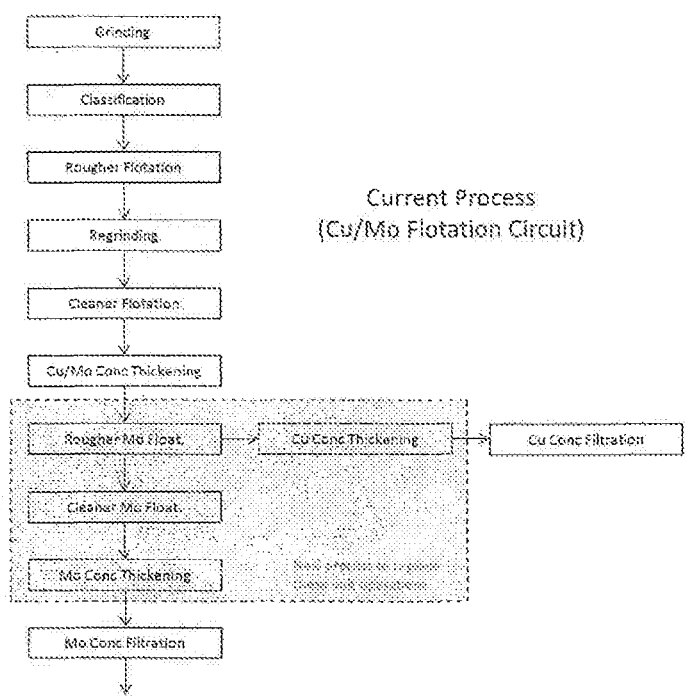
FIG. 18A shows one current process of a Cu/Mo flotation circuit that is known in the art, which contains a series of stages in a shaded area, for which a new process according to the present invention set forth herein will be implemented to replace these unit operations.

In summary, FIGS. 19A and 19b show a new and unique Cu/Mo separation media technology according to some embodiment of the present invention vis-a-vis the prior art techniques shown in relation to FIGS. 18A and 18B. The remaining FIGS. 1 to 16b show the subject matter of the aforementioned PCT application no. PCT/US12/39631 (712-2.395-1//CCS-0123), which is incorporated by reference, and which shows examples of the engineered polymeric hydrophobic media, as well as other technique that may be under in conjunction with that disclosed in relation to the new and unique Cu/Mo separation media technology shown in FIGS. 19A and 19B.

FIG. 19A: Media-Enhanced Moly Separation Technique

FIG. 19A shows a Cu/Mo separation media processor or circuit generally indicated by 600, according to some embodiment of the present invention. The Cu/Mo separation media processor or circuit includes steps/stages 602, 604, 606, 608, 610, 612, 614, 616, 618, as well as a series of steps/stages indicated by reference label 620, which correspond to the steps/stages of the new process according to the present invention to replace the aforementioned unit operations in the prior art processes shown in FIGS. 18A and 18B. In effect, the steps/stages 604, 606, 610, 612, 614 in the series of steps/stages 620 may be used to replace the highlighted steps/stages currently being used, e.g., in the shaded box in FIG. 18A or 18B, while the steps/stages 602, 608, 616 and 618 may be similar to the non-highlighted steps/stages, and thus may not replace these corresponding steps/stages currently being used.

In effect, the copper/moly separation process according to the present invention resolves the aforementioned inefficiencies by replacing the use of air bubble with purpose-build hydrophobic polymerized engineering bubbles/beads. Examples of the engineered polymeric bubbles/beads (also referred to herein as purpose-build hydrophobic polymerized engineering bubbles/beads) are set forth below, including that disclosed in relation to FIGS. 13a through 15b. Other examples of the engineered polymeric bubbles/beads developed by the assignee of the present invention are also disclosed in one or more of the other applications set forth below in the family of related applications, which are all incorporated by reference in their entirety.

By way of example, the process or processor 600, starting with the bulk sulfide concentrate, is or operates as follows.

1. Underflow from a bulk sulfide thickener ("Cu/Mo Conc Thickener") in step/stage 602 may be mixed and conditioned with sodium hydrosulfide (NaHS) in order to render the copper and iron sulfide minerals hydrophilic, so as to form a conditioned pulp.
2. In a molybdenum loading step/stage 604, the conditioned pulp may be contacted with the engineered polymeric hydrophobic media, e.g. in an agitated reaction chamber, and hydrophobic molybdenite is loaded on the engineered polymeric hydrophobic media, so as to form a slurry/media mixture. By way of example, the agitated reaction chamber may include, or take the form of, a tumbler-style reaction chamber, as well as a mechanical, rotating/tumbling, gravity flow, chemical, pneumatic, centrifugal reaction chamber. The engineered polymeric hydrophobic media may take the form of engineered polymeric bubble/beads, e.g., consistent with that set forth herein. The engineered polymeric hydrophobic media may also take the form of other engineered polymeric hydrophobic media disclosed herein.
3. The slurry/media mixture may be fed to a media recovery step/stage 606, e.g. consisting of a vibrating screen, rotating trommel or equivalent size- or other separation device, so as to recover a slurry product and a polymerized hydrophobic media product. As shown in FIG. 19A, water ($H^2O$) may be added to the recovery media stage 606. In the media recovery step/stage 606, the slurry product may be directed to a copper concentrate filtration step/stage 608 and the engineered polymeric hydrophobic media product may be directed to a wash step/stage 610. The copper concentrate filtration step/stage 608 filters and provides a copper concentrate.
4. By way of example, the media wash step/stage 610 may consist of a vibrating screen, trommel or equivalent equipped with wash water sprays to clean the loaded engineered polymeric hydrophobic media and eliminate the entrainment of hydrophilic particles. As shown in FIG. 19A, water ($H^2O$) may be added to the wash step/stage 610. In the media wash step/stage 610, the media may be advanced to a stripping stage 612 and the wash solution, e.g., containing any residual hydrophilic particles, is returned to the Cu/Mo thickening step/stage 602.

5. The cleaned media reports or may be provided to the media stripping step/stage 612 to remove the loaded hydrophobic minerals from the engineered polymeric hydrophobic media using a strip solution, surfactant, or equivalent.
6. The media stripping step/stage 612 may be configured to direct the slurried mixture of stripped media, recover hydrophobic particles and residual strip solution to a second media recovery step/stage 614, e.g., consisting of a screen, trommel, or equivalent device. The second media recovery step/stage 614 may be configured to recycle/return recovered media to the moly loading step/stage 604, and provide the remaining slurried mixture to a vacuum filter step/stage 616.
7. The vacuum filter step/stage 616 may be configured to recycle recovered strip solution to the media stripping step/stage 612, and filter and direct residual slurry, e.g., having recovered hydrophobic particles, to a moly concentration filter or filtration step/stage 618 that filters and provides molybdenum concentrate.

Embodiment are also envisioned, and the scope of the invention is intended to include, e.g., implementing the aforementioned Cu/Mo separation media technology consist with that set forth above, followed by a subsequent regrind step to improve liberation and the resulting grade.

Embodiment are also envisioned, and the scope of the invention is intended to include, e.g., implementing the aforementioned Cu/Mo separation media technology consist with that set forth above, using multiple loading/stripping cycles also to improve liberation and the resulting grade.

Advantages

The process according to the present invention, when taken in the context of the current state of the art set forth above, confers the following advantages:
1. It significantly reduces the consumption of expensive sodium hydrosulfide, because the primary cause of NaHS oxidation (air) is no longer necessary to achieve a molybdenum separation.
2. The elimination of entrainment greatly increases the selectivity of the process, and obviates the need for a complex sequence of cleaning flotation steps.
3. The removal of the froth zone greatly simplifies the materials handling operations of the process.
4. The ability to perform the separation at a high percent solids eliminates the need for the redundant copper concentrate thickener.
5. The improved grade will allow byproduct producers to sell byproduct molybdenite into the chemicals market.

FIG. 19B

By way of further example, see and compare the Cu/Mo separation media technology shown in FIG. 19B to that shown in FIG. 19A.

In particular, FIG. 19B shows a new and unique Cu/Mo separation media processor or circuit generally indicated by 700, according to some embodiment of the present invention. The Cu/Mo separation media processor or circuit 700 includes steps/stages 702, 704, 706, 708, 710, 712, 714, 716, as well as a series of steps/stages indicated by reference label 718, which corresponds to the new process to replace the aforementioned unit operations in the prior art processes shown in FIGS. 18A and 18B.

By way of example, the process or processor 700, starting with the bulk sulfide concentrate, is or operates as follows.

1. Underflow from a bulk sulfide thickener ("Cu/Mo Conc Thickener") in Cu/Mo concentrate thickening step/stage 702 may be mixed and conditioned with sodium hydrosulfide (NaHS) in order to render the copper and iron sulfide minerals hydrophilic, so as to form a conditioned pulp.
2. In a moly loading step/stage 704, the conditioned pulp may be contacted with an engineered polymeric hydrophobic media, e.g. in an agitated reaction chamber, and hydrophobic molybdenite is loaded on the engineered polymeric hydrophobic media, so as to form a slurry/media mixture. The molybdenum loading step/stage 704 may be configured to direct a slurry product to a copper concentrate filtration step/stage 706 and direct remaining media in the slurry/media mixture to a media wash step/stage 708. The copper concentrate filtration step/stage 706 may be configured to filter and provide a copper concentrate.
3. By way of example, the media wash step/stage 708 may consist of a vibrating screen, trommel or equivalent equipped with wash water sprays to clean the loaded media and eliminate the entrainment of hydrophilic particles. As shown in FIG. 19B, water ($H^2O$) may be added to the wash step/stage 610. In the media wash step/stage 708, the media may be advanced to a media stripping stage 710 and the wash solution, e.g., containing any residual hydrophilic particles, is returned to the Cu/Mo thickening step/stage 702.
4. The cleaned media reports or is provided to the media stripping step/stage 710 to remove the loaded hydrophobic minerals from the media using a strip solution, surfactant, or equivalent.
5. The media stripping step/stage 710 may be configured to direct the slurried mixture of stripped media, recovered hydrophobic particles and residual strip solution to a media recovery step/stage 712, e.g., consisting of a screen, trommel, or equivalent device. The media recovery step/stage 712 may be configured to recycle/return recovered media to the molybdenum loading step/stage 704, and provide the remaining slurried mixture to a vacuum filter step/stage 714.
6. The vacuum filter step/stage 714 may be configured to recycle recovered strip solution to the media stripping step/stage 710, and filter and direct residual slurry, e.g., having recovered hydrophobic particles, to a moly concentration filter or filtration step/stage 716 that filters and provides a molybdenum concentrate.

FIGS. 1 to 16b from the Parent Application

Figure 1:
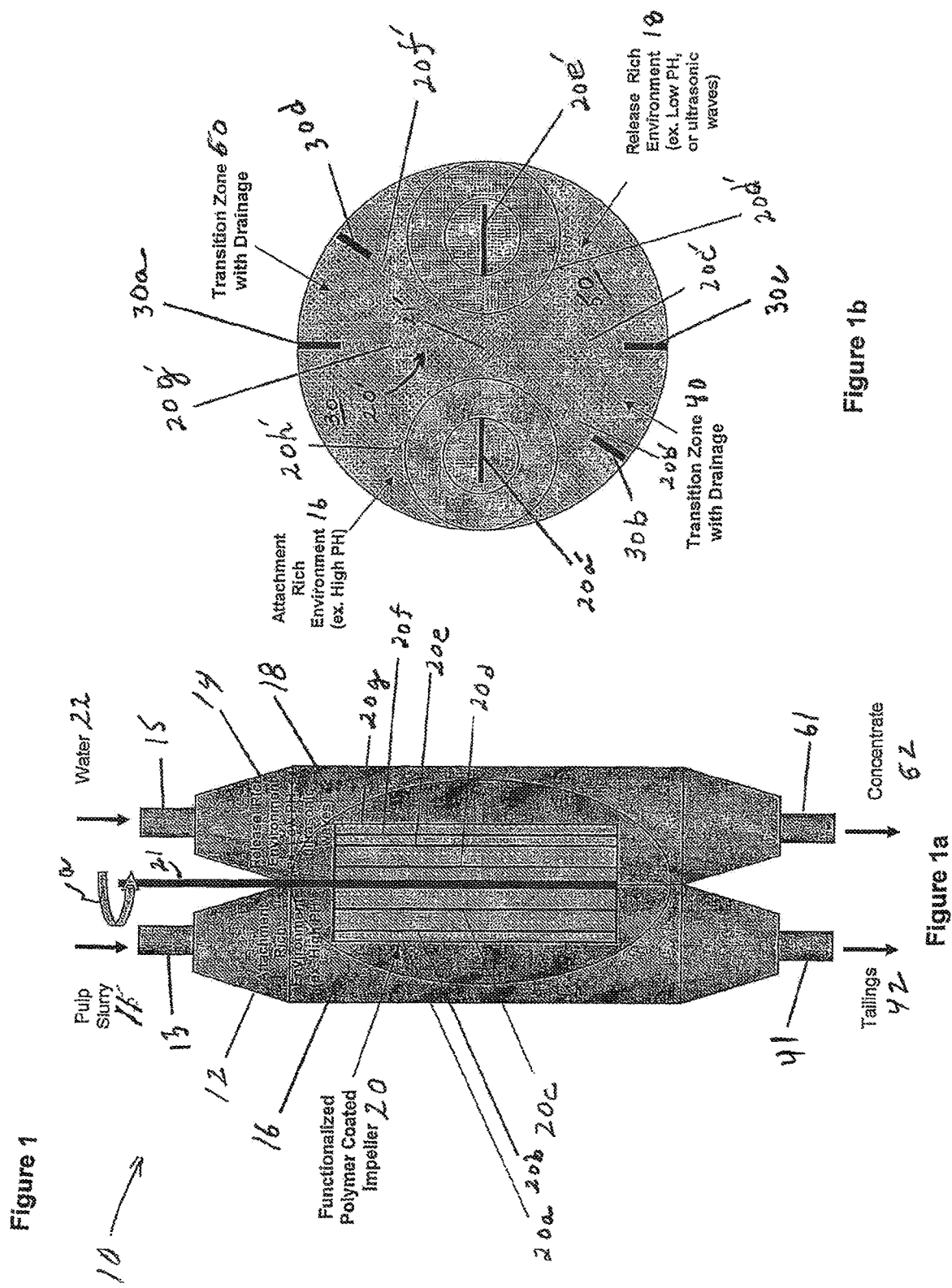
FIG. 1 includes FIG. 1a that is a side partial cutaway view in diagram form of a separation processor configured with two chambers, tanks or columns having a functionalized polymer coated impeller arranged therein according to some embodiments of the present invention, and includes FIG. 1b that is a top partial cross-sectional view in diagram form of a functionalized polymer coated impeller moving in an attachment rich environment contained in an attachment chamber, tank or column and also moving in a release rich environment contained in a release chamber, tank or column according to some embodiments of the present invention.

The remaining part of the application describes the subject matter of FIGS. 1 to 16b of the PCT application no. PCT/US14/37823 (712-2.395-1//CCS-0123), which discloses other types and kinds of engineered polymeric hydrophobic media that may be used in conjunction with the aforementioned, as follows:

FIGS. 1, 1a, 1b

By way of example, FIG. 1 shows the present invention is the form of a machine, device, system or apparatus 10, e.g., for separating valuable material from unwanted material in a mixture 11, such as a pulp slurry, using a first processor 12 and a second processor 14. The first processor 12 and the second processor 14 are configured with a functionalized polymer coated member that is shown, e.g., as a functionalized polymer coated impeller 20 (FIG. 1a), 20' (FIG. 1b), according to some embodiments of the present invention. In operation, the impeller 20, 20' slowly rotates in relation to the first processor 12 and the second processor 14, the impeller blades slowly pass through the attachment rich environment 16 in the first processor 12 where the valuable material is attached to the blades and through the release rich environment 18 in the second processor 14. is released from the blades. By way of example, the impeller 20 is shown rotating in a counterclockwise direction as indicated by arrow a, although the scope of the invention is not intended to be limited to the direction of the impeller rotation, or the manner in which the functionalized polymer coated impeller 20 (FIG. 1a), 20' (FIG. 1b) is arranged, mounted, or configured in relation to the first processor 12 and the second processor 14.

The first processor 12 may take the form of a first chamber, tank, cell or column that contains an attachment rich environment generally indicated as 16. The first chamber, tank or column 12 may be configured to receive via piping 13 the mixture or pulp slurry 11 in the form of fluid (e.g., water), the valuable material and the unwanted material in the attachment rich environment 16, e.g., which has a high pH, conducive to attachment of the valuable material. The second processor 14 may take the form of a second chamber, tank, cell or column that contains a release rich environment generally indicated as 18. The second chamber, tank, cell or column 14 may be configured to receive via piping 15, e.g., water 22 in the release rich environment 18, e.g., which may have a low pH or receive ultrasonic waves conducive to release of the valuable material. Attachment rich environments like that forming part of element environment 16 conducive to the attachment of a valuable material of interest and release rich environments like that forming part of environment 18 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 16 and a corresponding release rich environment like environment 18 based on the separation technology disclosed herein for any particular valuable mineral of interest, e.g., copper, forming part of any particular mixture or slurry pulp.

In operation, the first processor 12 may be configured to receive the mixture or pulp slurry 11 of water, valuable material and unwanted material and the functionalized polymer coated member that is configured to attach to the valuable material in the attachment rich environment 16. In FIG. 1, the functionalized polymer coated member is shown as the functionalized polymer coated impeller 20 (FIG. 1a), 20' (FIG. 1b). In FIG. 1a, the functionalized polymer coated impeller 20 has a shaft 21 and at least one impeller blade 20a, 20b, 20c, 20d, 2e, 20f, 20g and is configured to rotate slowly inside the first processor 12 and the second processor 14. In FIG. 1b, the functionalized polymer coated impeller 20' has a shaft 21' and impeller blades 20a', 20b', 20c', 20d', 2e', 20f', 20g' and 20h'. Each impeller blade in FIG. 1 is understood to be configured and functionalized with a polymer coating to attach to the valuable material in the attachment rich environment 16. (The scope of the invention is not intended to be limited to the number of blades on the impeller 20, 20' and the embodiment in FIGS. 1a and 1b is shown with impellers 21, 21' having a different number of blades.)

In FIG. 1, the first processor 12 is configured to receive at least one impeller blade of the functionalized polymer coated impeller 20 (FIG. 1a), 20' (FIG. 1b). In FIG. 1b, the at least one impeller blade is shown as impeller blade 20g' being received in an attachment zone 30 that forms part of the attachment rich environment 16 defined by walls 30a, 30b. The first processor 12 may also be configured with a first transition zone generally indicated as 40 to provide drainage from piping 41 of, e.g., tailings 42 as shown in FIG. 1a.

The first processor 12 may also be configured to provide at least one enriched impeller blade having the valuable material attached thereto, after passing through the attachment rich environment 16. In FIG. 1b, the at least one enriched impeller blade is shown as the at least one enriched impeller blade 20c' being provisioned from the attachment rich environment 16 in the first processor 12 to the release rich environment 18 in the second processor 14.

The second processor 14 may be configured to receive via the piping 15 the fluid 22 (e.g. water) and the enriched functionalized polymer coated member to release the valuable material in the release rich environment 18. In FIG. 1b, the second processor 14 is shown receiving the enriched impeller blade 20c' in a release zone 50, e.g., that forms part of the release rich environment 18 and is defined, e.g., by walls 30c and 30d.

The second processor 14 may also be configured to provide the valuable material that is released from the enriched functionalized polymer coated member into the release rich environment 18. For example, in FIG. 1b the second processor 14 is shown configured with a second transition zone 60 defined by walls 30a and 30d to provide via piping 61 drainage of the valuable material in the form of a concentrate 62 (FIG. 1a).

Figure 2:
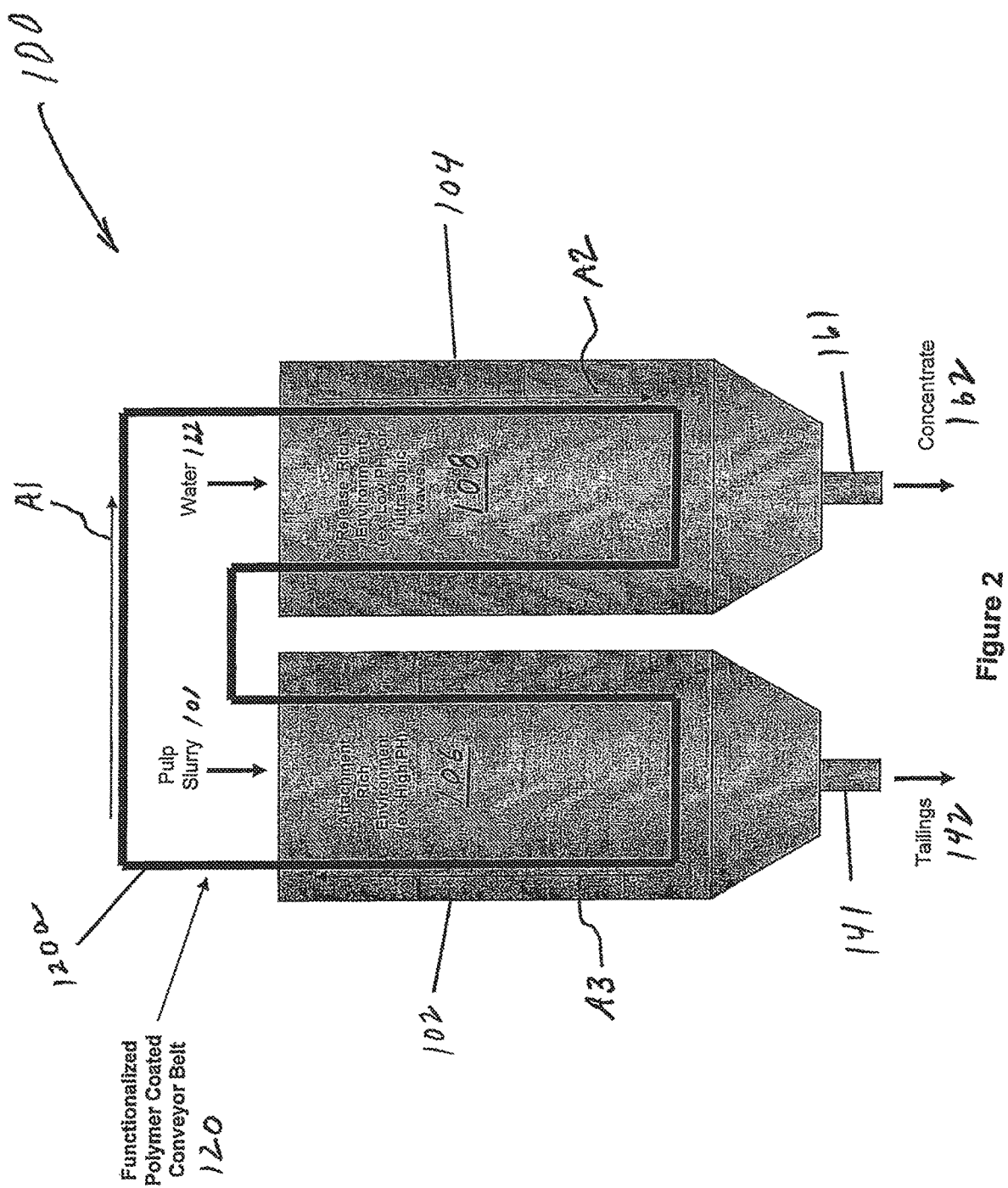
FIG. 2 is diagram of a separation processor configured with two chambers, tanks or columns having a functionalized polymer coated conveyor belt arranged therein according to some embodiments of the present invention.

FIG. 2: The Functionalized Polymer Coated Conveyor Belt

By way of example, FIG. 2 shows the present invention is the form of a machine, device, system or apparatus 100, e.g., for separating valuable material from unwanted material in a mixture 101, such as a pulp slurry, using a first processor 102 and a second processor 104. The first processor 102 and the second processor 104 are configured with a functionalized polymer coated member that is shown, e.g., as a functionalized polymer coated conveyor belt 120 that runs between the first processor 102 and the second processor 104, according to some embodiments of the present invention. The arrows A1, A2, A3 indicate the movement of the functionalized polymer coated conveyor belt 120. Techniques, including motors, gearing, etc., for running a conveyor belt like element 120 between two processors like elements 102 and 104 are known in the art, and the scope of the invention is not intended to be limited to any particular type or kind thereof either now know or later developed in the future. According to some embodiments of the present invention, the functionalized polymer coated conveyor belt 120 may be made of a mesh material.

The first processor 102 may take the form of a first chamber, tank, cell or column that contains an attachment rich environment generally indicated as 106. The first chamber, tank or column 102 may be configured to receive the mixture or pulp slurry 101 in the form of fluid (e.g., water), the valuable material and the unwanted material in the attachment rich environment 106, e.g., which has a high pH, conducive to attachment of the valuable material. The second processor 104 may take the form of a second chamber, tank, cell or column that contains a release rich environment generally indicated as 108. The second chamber, tank, cell or column 104 may be configured to receive, e.g., water 122 in the release rich environment 108, e.g., which may have a low pH or receive ultrasonic waves conducive to release of the valuable material. Consistent with that stated above, attachment rich environments like that forming part of element environment 106 conducive to the attachment of a valuable material of interest and release rich environments like that forming part of environment 108 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 106 and a corresponding release rich environment like environment 108 based on the separation technology disclosed herein for any particular valuable mineral of interest, e.g., copper, forming part of any particular mixture or slurry pulp.

In operation, the first processor 102 may be configured to receive the mixture or pulp slurry 101 of water, valuable material and unwanted material and the functionalized polymer coated conveyor belt 120 that is configured to attach to the valuable material in the attachment rich environment 106. In FIG. 2, the belt 120 is understood to be configured and functionalized with a polymer coating to attach to the valuable material in the attachment rich environment 106.

The first processor 102 may also be configured to provide drainage from piping 141 of, e.g., tailings 142 as shown in FIG. 2.

The first processor 102 may also be configured to provide an enriched functionalized polymer coated conveyor belt having the valuable material attached thereto, after passing through the attachment rich environment 106. In FIG. 2, the enriched functionalized polymer coated conveyor belt is shown, e.g., as that portion or part 120a of the belt 120 being provisioned from the attachment rich environment 106 in the first processor 102 to the release rich environment 108 in the second processor 104. It is understood that some other portions or parts of the belt 120 may be enriched, including the portion or part immediately leaving the attachment rich environment 106, as well as the portion or part immediately entering the release rich environment 108.

The second processor 14 may be configured to receive the fluid 122 (e.g. water) and the portion 120a of the enriched functionalized polymer coated conveyor belt 120 to release the valuable material in the release rich environment 108.

The second processor 104 may also be configured to provide the valuable material that is released from the enriched functionalized polymer coated member into the release rich environment 108. For example, in FIG. 2 the second processor 104 is shown configured to provide via piping 161 drainage of the valuable material in the form of a concentrate 162.

In FIG. 2, the first processor 102 is configured with the functionalized polymer coated conveyor belt 120 passing through with only two turns inside the attachment rich environment 106. However, embodiments are envisioned in which the first processor 102 may be configured to process the functionalized polymer coated conveyor belt 120 using a serpentine technique for winding or turning the belt 120 one way and another way, back and forth, inside the first processor to maximize surface area of the belt inside the processor 102 and exposure of the belt 120 to the attachment rich environment 106.

Figure 3:
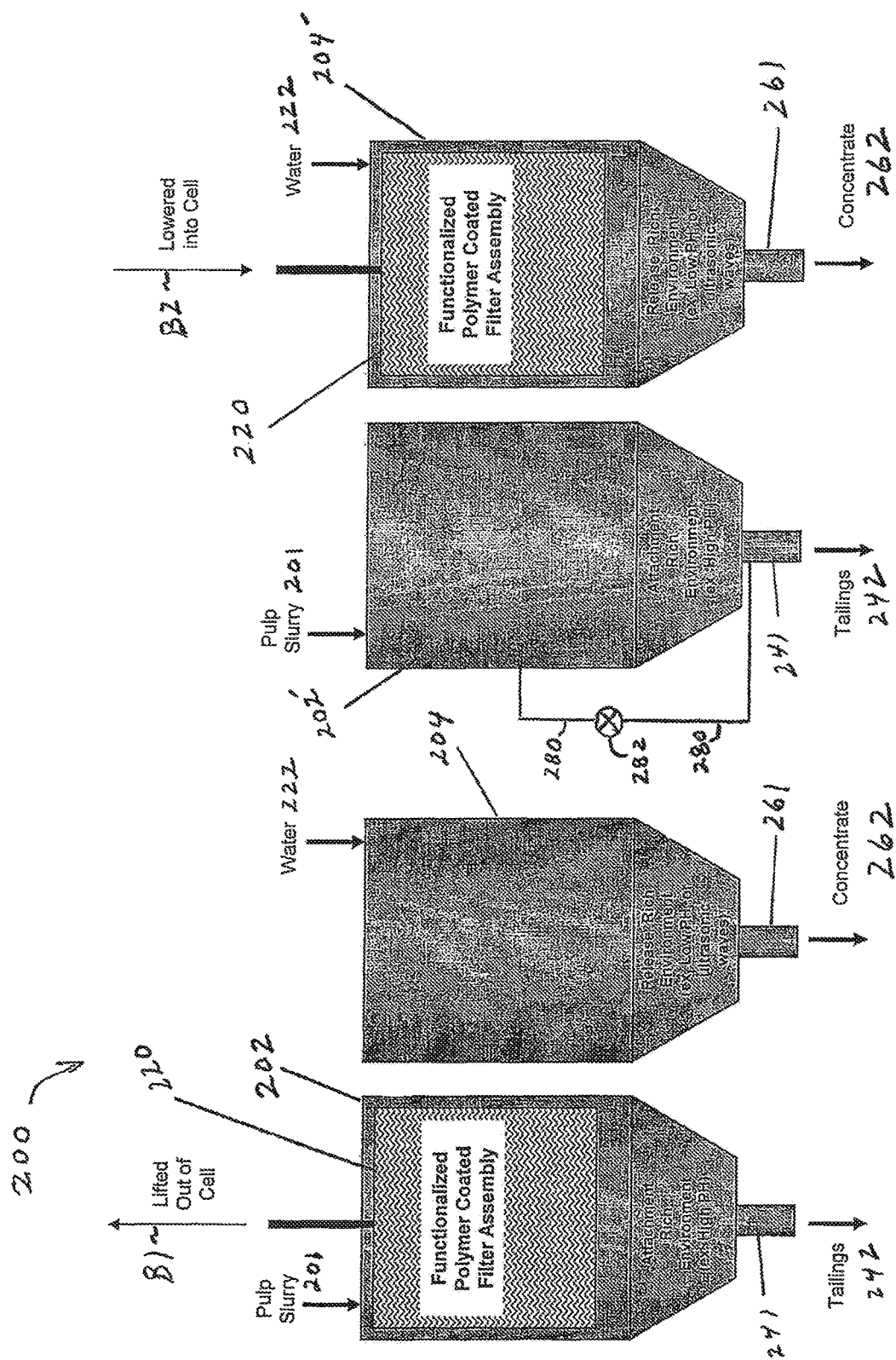
FIG. 3 is diagram of a separation processor configured with a functionalized polymer coated filter assembly for moving between two chambers, tanks or columns in a semi-continuous batch process according to some embodiments of the present invention.

FIG. 3: The Functionalized Polymer Coated Filter

By way of example, FIG. 3 shows the present invention is the form of a machine, device, system or apparatus 200, e.g., for separating valuable material from unwanted material in a mixture 201, such as a pulp slurry, using a first processor 202, 202' and a second processor 204, 204'. The first processor 202 and the second processor 204 are configured to process a functionalized polymer coated member that is shown, e.g., as a functionalized polymer coated collection filter 220 configured to be moved between the first processor 202 and the second processor 204' as shown in FIG. 3 as part of a batch type process, according to some embodiments of the present invention. In FIG. 3, by way of example the batch type process is shown as having two first processor 202, 202' and second processor 204, 204, although the scope of the invention is not intended to be limited to the number of first or second processors. Moreover, embodiments are envisioned using a different number of first and second processor, different types or kinds of processors, as well as different types or kinds of processors both now known or later developed in the future. According to some embodiments of the present invention, the functionalized polymer coated collection filter 220 may take the form of a membrane or a thin soft pliable sheet or layer. The arrow B1 indicates the movement of the functionalized polymer coated filter 220 from the first processor 202, and the arrow B2 indicates the movement of the functionalized polymer coated collection filter 220 into the second processor 202. Techniques, including motors, gearing, etc., for moving a filter like element 220 from one processor to another processor like elements 202 and 204 are known in the art, and the scope of the invention is not intended to be limited to any particular type or kind thereof either now know or later developed in the future.

The first processor 202 may take the form of a first chamber, tank, cell or column that contains an attachment rich environment generally indicated as 206. The first chamber, tank or column 102 may be configured to receive the mixture or pulp slurry 201 in the form of fluid (e.g., water), the valuable material and the unwanted material in the attachment rich environment 206, e.g., which has a high pH, conducive to attachment of the valuable material. The second processor 204 may take the form of a second chamber, tank, cell or column that contains a release rich environment generally indicated as 208. The second chamber, tank, cell or column 204 may be configured to receive, e.g., water 222 in the release rich environment 208, e.g., which may have a low pH or receive ultrasonic waves conducive to release of the valuable material. Consistent with that stated above, attachment rich environments like that forming part of element environment 206 conducive to the attachment of a valuable material of interest and release rich environments like that forming part of environment 208 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 206 and a corresponding release rich environment like environment 208 based on the separation technology disclosed herein for any particular valuable mineral of interest, e.g., copper, forming part of any particular mixture or slurry pulp.

In operation, the first processor 202 may be configured to receive the mixture or pulp slurry 101 of water, valuable material and unwanted material and the functionalized polymer coated collection filter 220 that is configured to attach to the valuable material in the attachment rich environment 206. In FIG. 3, the functionalized polymer coated collection filter 220 is understood to be configured and functionalized with a polymer coating to attach to the valuable material in the attachment rich environment 106.

The first processor 202 may also be configured to provide drainage from piping 241 of, e.g., tailings 242 as shown in FIG. 3.

The first processor 202 may also be configured to provide an enriched functionalized polymer coated collection filter having the valuable material attached thereto, after soaking in the attachment rich environment 106. In FIG. 3, the enriched functionalized polymer coated collection filter 220 is shown, e.g., being provisioned from the attachment rich environment 206 in the first processor 202 to the release rich environment 208 in the second processor 204.

The second processor 204 may be configured to receive the fluid 222 (e.g. water) and the enriched functionalized polymer coated collection filter 220 to release the valuable material in the release rich environment 208.

The second processor 204 may also be configured to provide the valuable material that is released from the enriched functionalized polymer coated collection filter 220 into the release rich environment 208. For example, in FIG. 3 the second processor 204 is shown configured to provide via piping 261 drainage of the valuable material in the form of a concentrate 262.

The first processor 202' may also be configured with piping 280 and pumping 280 to recirculate the tailings 242 back into the first processor 202'. The scope of the invention is also intended to include the second processor 204' being configured with corresponding piping and pumping to recirculate the concentrate 262 back into the second processor 204'. Similar recirculation techniques may be implemented for the embodiments disclosed in relation to FIGS. 1-2 above.

The scope of the invention is not intended to be limited to the type or kind of batch process being implemented. For example, embodiments are envisioned in which the batch process may include the first and second processors 202, 204 being configured to process the enriched functionalized polymer coated collection filter 220 in relation to one type or kind of valuable material, and the first and second processors 202', 204' being configured to process the enriched functionalized polymer coated collection filter 220 in relation to either the same type or kind of valuable material, or a different type or kind of valuable material. Moreover, the scope of the invention is intended to include batch processes both now known and later developed in the future.

In order to further clarify the term "functionalized polymer" as applied to the coated impeller 20 (FIG. 1a), the coated conveyor belt 120 (FIG. 2) and the collection filter 220 (FIG. 3), various surfaces to be coated are illustrated in FIGS. 4-6. The various physical structures of the surfaces to be coated are illustrated in FIGS. 7a-7f, and some embodiments of the functionalized polymer are depicted in FIGS. 8a, 8b, 8c, 9a, 9b and 9c.

By way of example, the polymer, according to some embodiments of the present invention, at least can be functionalized to attract particles in two different ways.

Figure 8C:
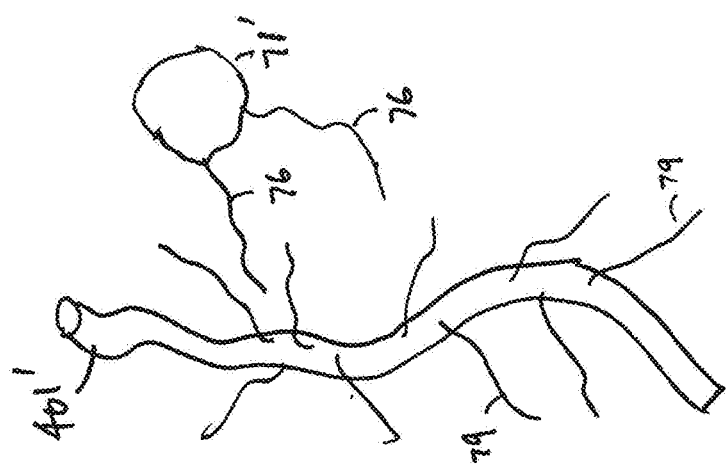
FIG. 8c illustrates a plurality of hydrophobic molecules attached to a fiber for attracting non-mineral particles according to some embodiments of the present invention.

1. The polymer surface has a plurality of molecules 73 (FIGS. 8a, 9a) having a functional group 78 (FIGS. 8a, 8b) to attract mineral particles 72 (FIGS. 8a, 9a).

2. The polymer surface has a plurality of molecules 79 (FIGS. 8b, 9b, 9c, 9d) rendering the surface hydrophobic in order to attract mineral particles 71, 71' (FIGS. 8b, 9b, 9c, 9d). Molecules 79 represent siloxane functional groups. The siloxane functional groups may be provided by one or more of dimethyl siloxane, dimethylvinyl-terminated; polydimethylsiloxane; and dimethyl, methylhydrogen siloxane. The siloxane functional groups may be provided by dimethyl siloxane, hydrogen-terminated.

Polymer Surface Having Functional Groups

The term "polymer" in this disclosure means a large molecule made of many units of the same or similar structure linked together. In some embodiments of the present invention, the polymer surface on a filter has a plurality of molecules 73 (FIGS. 8a, 9a) having a functional group 78 (FIGS. 8a, 8b) to attract mineral particles 72 (FIGS. 8a, 9a). In these embodiments, the unit can be a monomer or an oligomer which forms the basis of, for example, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, polydimethylsiloxane and other organic or inorganic polymers. Thus, the synthetic material can be hard or rigid like plastic or soft and flexible like an elastomer. While the physical properties of the filter can vary, the surface of the filter is chemically functionalized to provide a plurality of functional groups to attract mineral particles. The terms "valuable material" and "mineral particle" are used herein interchangeably. It is possible to use a molecule or molecular segment 76 (FIG. 8a, 9a) to attach a functional group 78 to the polymer surface. In general, the molecule 76 can be a hydrocarbon chain, for example, and the functional group 78 can be ionic for attracting a mineral, such as copper to the surface 74. A xanthate, for example, has both the functional group 78 and the molecular segment 76 to be incorporated into the polymer that is used to make or coat the surface. A functional group 78 is also known as a collector that is either ionic or non-ionic. The ion can be anionic or cationic. An anion includes, but not limited to, oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines. Similarly, a chelating agent can be incorporated into the polymer as a collector site for attaching to a mineral, such as copper. A surface having a functionalized polymer is also referred herein as synthetic surface.

Polymer Having Molecules to Render a Surface Hydrophobic

In some embodiments of the present invention, at least the surface of a filter surface is functionalized so that the surface is hydrophobic. It is possible to functionalize a polymer surface to have a plurality of molecules 79 (FIGS. 8b, 8c, 9b, 9c) to render the surface hydrophobic. The molecules 79 may comprise a siloxane functional group.

In chemistry, hydrophobicity is the physical property of a molecule (known as a hydrophobe) that is repelled from a mass of water. Hydrophobic molecules tend to be non-polar and, thus, prefer other neutral molecules and non-polar solvents. Hydrophobic molecules in water often cluster together. According to thermodynamics, matter seeks to be in a low-energy state, and bonding reduces chemical energy. Water is electrically polarized, and is able to form hydrogen bonds internally, which gives it many of its unique physical properties. But, since hydrophobes are not electrically polarized, and because they are unable to form hydrogen bonds, water repels hydrophobes, in favor of bonding with itself. It is this effect that causes the hydrophobic interaction.

The hydrophobic effect is the observed tendency of non-polar substances to aggregate in aqueous solution and exclude water molecules. It can be observed as the segregation and apparent repulsion between water and non-polar substances. The hydrophobic interaction is mostly an entropic effect originating from the disruption of hydrogen bonds between molecules of liquid water by the non-polar solute. A hydrocarbon chain or a similar non-polar region or a big molecule is incapable of forming hydrogen bonds with water. The introduction of such a non-hydrogen bonding surface into water causes disruption of the hydrogen bonding network between water molecules. By aggregating together, nonpolar molecules reduce the surface area exposed to water and minimize their disruptive effect.

Froth flotation is a process for selectively separating hydrophobic materials from hydrophilic. The process has been adapted and applied to a wide variety of materials to be separated, and additional collector agents, including surfactants and synthetic compounds have been adopted for various applications.

In mining operations, froth flotation is a process for separating minerals from gangue by taking advantage of differences in their hydrophobicity. Hydrophobicity differences between valuable minerals and waste gangue are increased through the use of surfactants and wetting agents. The selective separation of the minerals makes processing complex (that is, mixed) ores economically feasible. The flotation process is used for the separation of a large range of sulfides, carbonates and oxides prior to further refinement. Phosphates and coal are also upgraded (purified) by flotation technology. Froth flotation commences by comminution (that is, crushing and grinding), which is used to increase the surface area of the ore for subsequent processing. The ore include the desired minerals and other unwanted materials, know a gangue. The process of grinding the ore into a fine power is known as liberation. The fine powder ore is then mixed with water to form a slurry. The desired mineral is rendered hydrophobic by the addition of a surfactant or collector chemical. The particular chemical depends on which mineral is being refined. This slurry (more properly called the pulp) of hydrophobic mineral particles and hydrophilic gangue particles is then placed in a flotation column or horizontal pipeline wherein the concentrated mineral is separated from the tailings containing the gangue. To be effective on a given ore slurry, the collectors are chosen based upon their selective wetting of the types of particles to be separated. A good collector will adsorb, physically or chemically, with one of the types of particles. In a flotation circuit for mineral concentration, various flotation reagents are added to a mixture of ore and water (called pulp) in a conditioning tank. The flow rate and tank size are designed to give the minerals enough time to be activated. The conditioner pulp is fed to a bank of rougher cells which remove most of the desired minerals as a concentrate. The rougher pulp passes to a bank of scavenger cells where additional reagents may be added. The scavenger cell froth is usually returned to the rougher cells for additional treatment, but in some cases may be sent to special cleaner cells. The scavenger pulp is usually barren enough to be discarded as tails. More complex flotation circuits have several sets of cleaner and re-cleaner cells, and intermediate re-grinding of pulp or concentrate. Because of a number of other factors, as much as 15% of the liberated minerals are not recovered and are discarded as gangue.

Collectors

Collectors either chemically bond (chemisorption) on a hydrophobic mineral surface, or adsorb onto the surface in the case of, for example, coal flotation through physisorption. Collectors increase the natural hydrophobicity of the surface, increasing the separability of the hydrophobic and hydrophilic particles. The hydrophobic particles of interest, according to the present invention, are depicted as particles 71', 72' in FIGS. 8*b*, 8*c*, 9*b* and 9*c*.

FIGS. 4, 5 and 6: Impellers, Conveyor Belts and Filters

By way of example, the impeller 20 (FIG. 1) has a collection area 23 to support the functionalized polymer (FIG. 4). The conveyor belt 120 (FIG. 2) has a collection area 123 to support the functionalized polymer (FIG. 5). The filter 220 (FIG. 3) has a collection area 223 to support the functional polymer (FIG. 6). The collection area 23, 123 and 223 can take many forms and have various surface features (FIGS. 7*a*-7*f*) to attract the mineral particles of interest, when the impeller 20, conveyor belt 120 and the filter 220 are made contact with a mixture or pulp slurry 11 (FIG. 1), 101 (FIG. 2), 201 (FIG. 3) that includes water and valuable material.

FIGS. 7*a*-7*f*: Surface Features

Figure 7A:
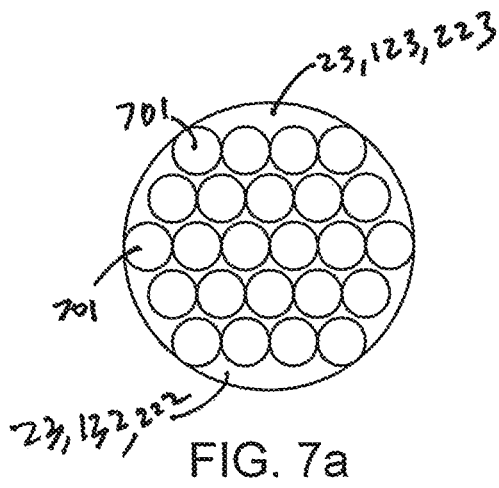
FIGS. 7a-7f illustrates various surface features of the impeller, conveyor belt and filter according to some embodiments of the present invention.
Figure 7B:
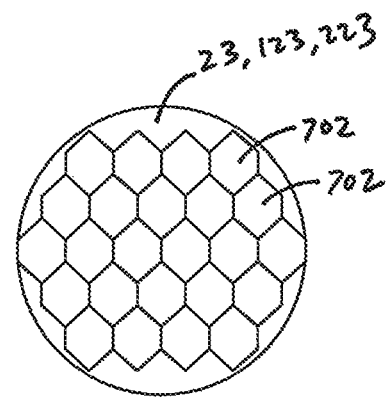
Figure 7C:
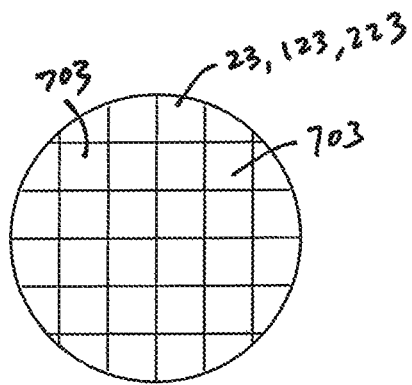
Figure 7D:
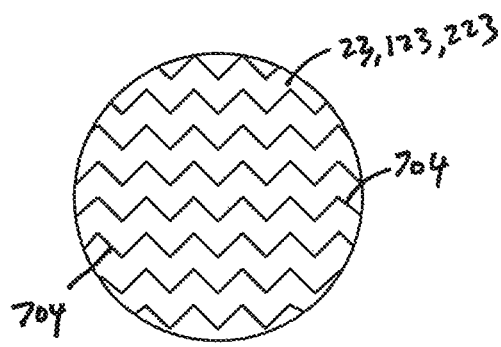
Figure 7E:
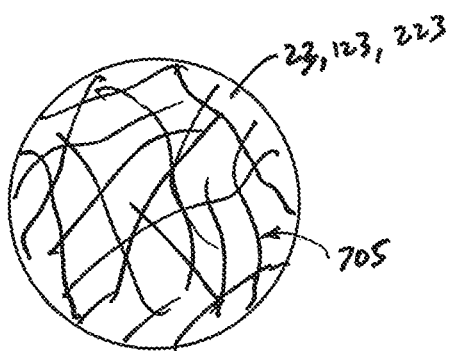
Figure 7F:
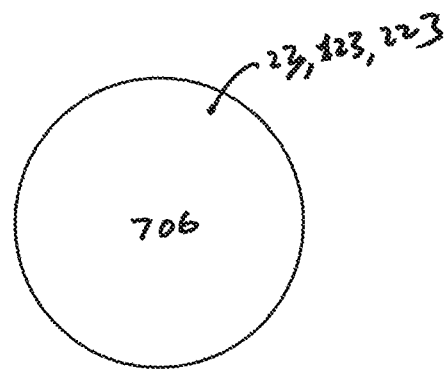

By way of example, each of the collection areas 23, 123 and 223 (FIGS. 4-6) may have a plurality of openings to allow the pulp slurry 11 (FIG. 1), 101 (FIG. 2), 201 (FIG. 3) to pass through while collecting at least part of the valuable material in the pulp slurry. The surface inside an opening and the surfaces or edges around the opening will be provided with the functional groups to attract the mineral particles. Those surfaces are referred to as collection surfaces. For example, the openings on the collection areas 23, 123 and 223 can take the form of holes or cylindrical passage ways 701 as shown in FIG. 7*a*. The openings on the collection areas 23, 123 and 223 can take the form of hexagonal passage ways 702 arranged like honeycomb, as shown in FIG. 7*b*. The collection areas 23, 123 and 223 can have a rectangular grid 703, as shown in FIG. 7*c*. The collection areas 23, 123 and 223 may comprise a stack of wavy sheets 704 a shown in FIG. 7*d*. The collection areas 23, 123 and 223 may comprise an irregular arrangement of fiber-like structures 705 as shown in FIG. 7*e*. The collection areas 23, 123 and 223 may comprise a plain surface 706 as shown in FIG. 7*f*. The plain surface 06 may be a smooth surface, a paper-like surface or matted surface, without larger structures. The collection area 23, 123 and 223 can be made of a synthetic material, such as a polymer functionalized for attracting the mineral particles. Alternatively, only the collection surfaces are coated with such a polymer. In a different embodiment of the present invention, the collection area 223 comprises a panel, such as a glass panel, a ceramic panel and a metal sheet, wherein one or both sides of the panel has a plain surface 706. In yet another embodiment of the present invention, the impeller 20 and the filter 220 comprise a collection of synthetic bubbles or beads as shown in FIGS. 12*a*-12*b*.

FIGS. 8*a*-9*c*: Surface Molecules

Figure 8B:
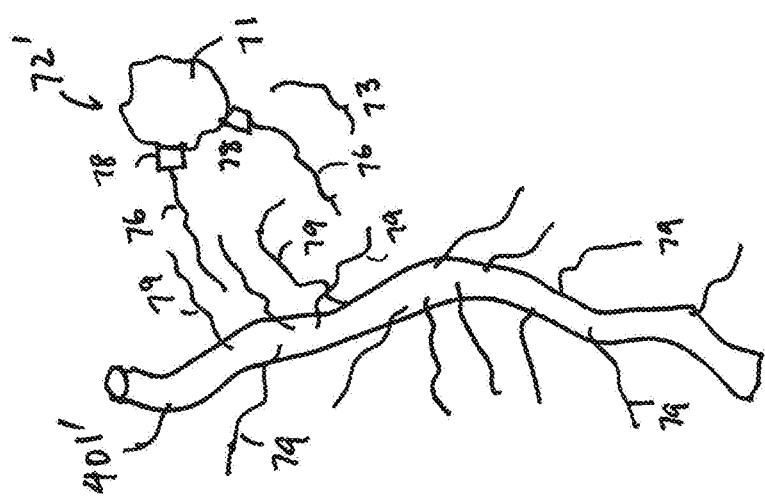
FIG. 8b illustrates a plurality of hydrophobic molecules attached to a fiber for attracting mineral particles, according to some embodiments of the present invention.
Figure 8A:
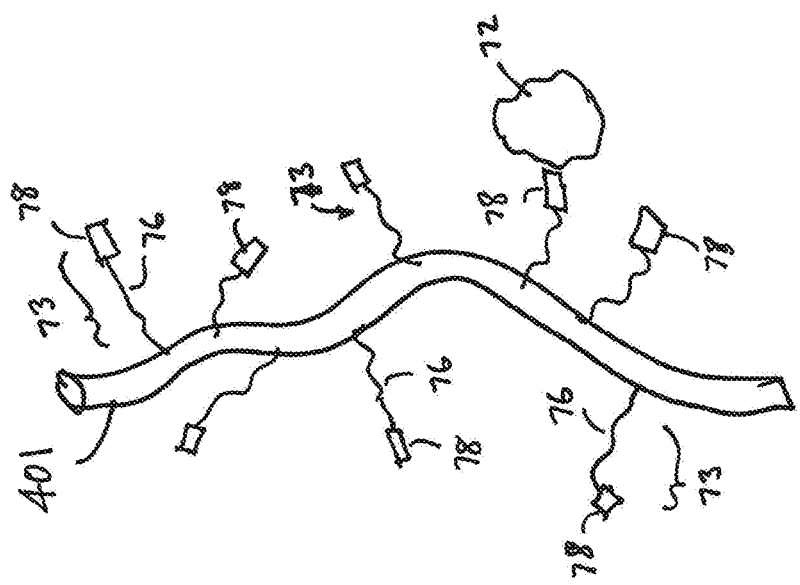
FIG. 8a illustrates a plurality of functional groups attached to a fiber for attracting mineral particles according to some embodiments of the present invention.
Figure 9A:
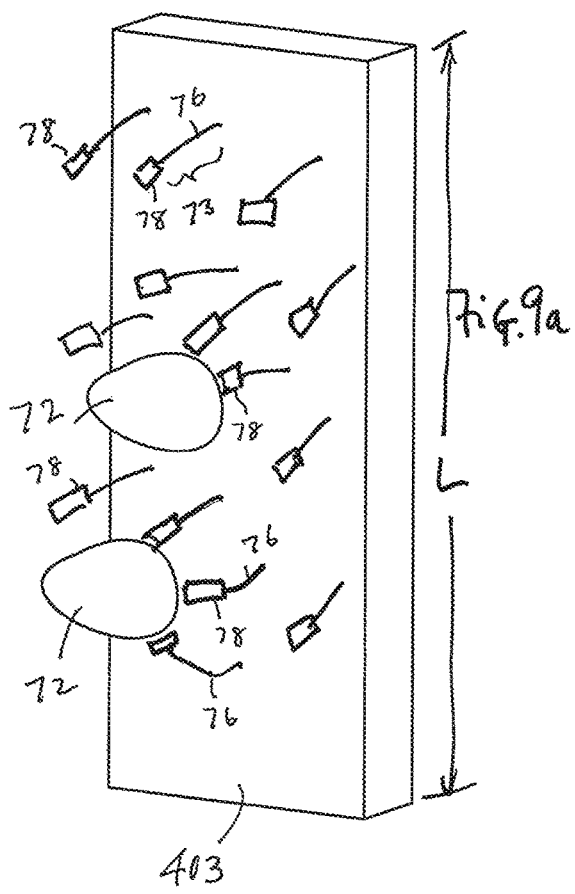
FIG. 9a illustrates a plurality of functional groups attached to surfaces for attracting mineral particles, according to some embodiments of the present invention.

By way of example, the fiber-like structures 705 (FIG. 7*e*) can be functionalized so that they become attached to molecules 73 (FIGS. 8*a*, 8*b*). The fiber-like structures 705 as shown in FIG. 7*e* can be made of individual fibers 401, 401' as shown in FIG. 8*a*-8*c*. In one embodiment of the present invention, the fiber 401 (FIG. 8*a*) can be made of a polymer that has a plurality of molecules 73 to provide the functional group 78 and the attaching molecular segment 76. A xanthate, for example, has both the functional group 78 and the molecular segment 76 to be incorporated into the polymer that is used to make the fiber 401. A functional group 78 is also known as a collector that is ionic or non-ionic to attract mineral particles 72. The ion can be anionic or cationic. An anion includes, but not limited to, oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines. In another embodiment of the present invention, the fiber 401 is coated with polymer that has the molecules 73 to provide the functional group 78 and the attaching molecular segment 76. With such a coating, the fiber 401 can be made of glass, ceramic, metal, nylon, cotton or a different polymer. A diagram of the fiber 401 and the attached molecules 73 is shown in FIG. 8*a*.

Figure 9C:
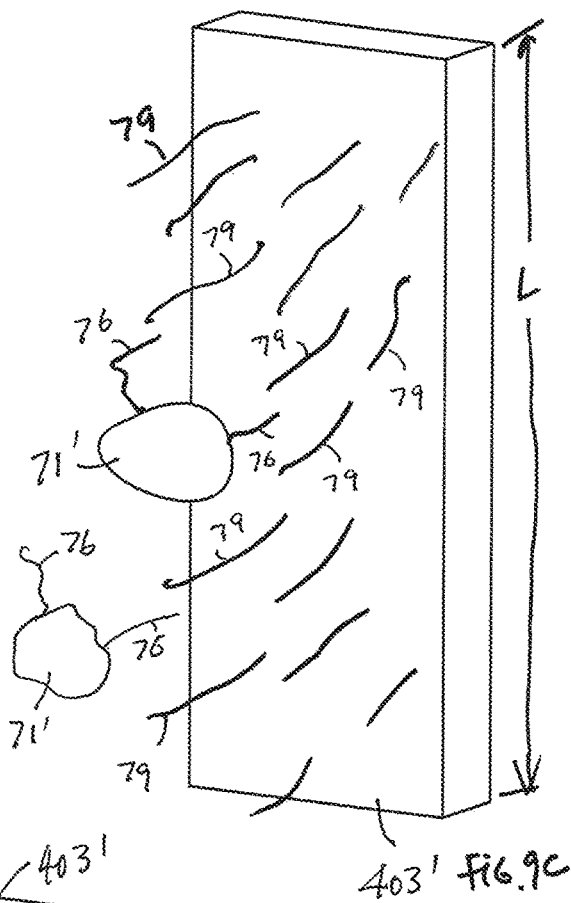
FIG. 9c illustrates a plurality of hydrophobic molecules attached to surfaces for attracting non-mineral particles, according to some embodiments of the present invention.
Figure 9B:
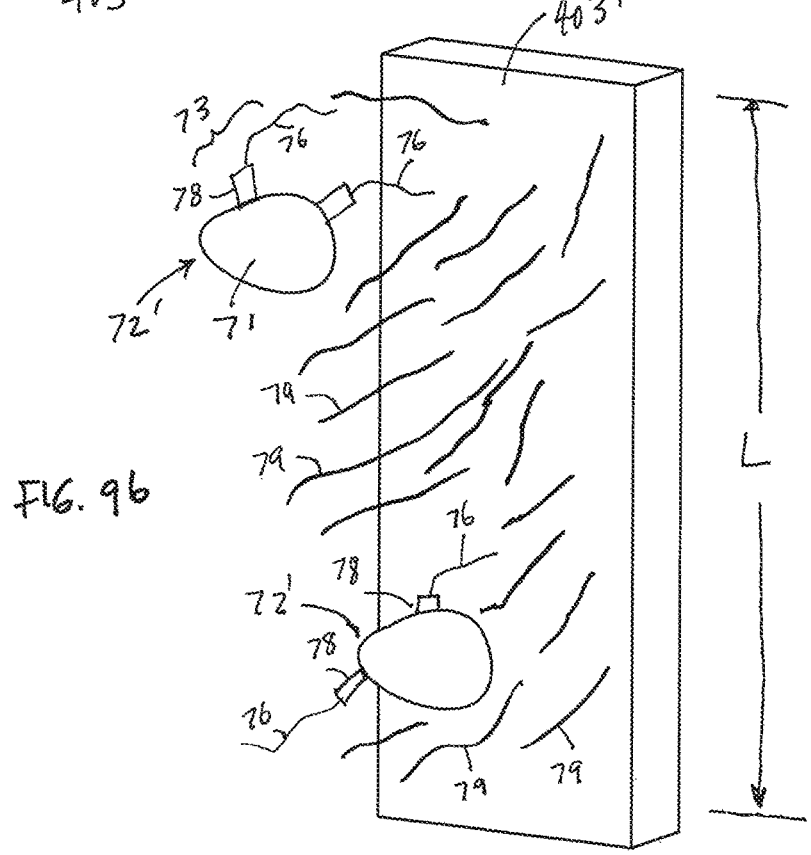
FIG. 9b illustrates a plurality of hydrophobic molecules attached to surfaces for attracting mineral particles, according to some embodiments of the present invention.

In a different embodiment of the present invention, the fiber 401' (FIG. 8*b*) can be made of a polymer that has a plurality of molecules 79 to render the fiber 401' (and thus the collection areas 23, 123 and 223 of FIGS. 4, 5, 6) hydrophobic. The polymer can be a hydrophobic material such as polystyrene, poly(d,l-lactide), poly(dimethylsiloxane), polypropylene, polyacrylic, polyethylene, etc. The polymer can also be a hydrophobically-modified polymer, such as hydrophobically-modified ethyl hydroxyethyl cellulose. Alternatively, the fiber 401' can be made of glass, ceramic, metal, nylon, cotton or other fabric materials and coated with hydrophobic molecules, such as a siloxane functional group in a silicone gel. The molecules 79 cause the fiber 401' to become hydrophobic. As such, a hydrophobically-modified mineral particle 72' can be attracted to the hydrophobic fiber 401'. The hydrophobically-modified, or wetted, mineral particle 72' comprises a mineral particle 71 and one or more molecules 73 attached thereon. The molecule 73, or collector, has a functional group 78 attached to the mineral particle 71 and a hydrophobic chain or molecular segment 76. A diagram showing the attraction between the hydrophobic chain or molecular segments 76 and the hydrophobic fiber 401' is shown in FIG. 8*b*. It should be understood that the particles 72' may be non-mineral and can be some harmful particles in a body of water. Furthermore, the hydrophobic fiber 401' can also be used to attract non-mineral particles. For example, if a non-mineral particle 71' has one or more hydrophobic chains or molecular segments 76, the non-mineral particle 71' is also attracted to the hydrophobic fiber 401'. A diagram showing the attraction between non-mineral particles 71' and the hydrophobic fiber 401' is shown in FIG. 8*c*. Thus, the hydrophobic fiber 401' can be used in a filter, impeller or conveyor belt (similar to those shown in FIGS. 4-6) for water-pollution control, water purification, etc. The surfaces and edges around the openings or surface structures 701, 702, 703, 704 (FIGS. 7*a*-7*d*) can be functionalized to provide the molecules 73 (FIGS. 9*a*, 9*b*). The exposed surfaces and edges around the openings or surface structures 701, 702, 703, 704 are represented by surface portions 403, 403' as shown in FIGS. 9*a*-9*c*. The length L of the surface portions 403, 403' can be equal to the thickness of the impeller 20, conveyor belt 120 and filter 220 (FIGS. 4-6). As with the fiber 401 as shown in FIG. 8*a*, the surface portion 403 can be made of a polymer that has a plurality of molecules 73 to provide the functional group 78 and the attaching molecular segment 76. In a different embodiment, the surface portion 403 is coated with polymer that has the molecules 73 to provide the functional group 78 and the attaching molecular segment 76. The surface portion 403 can be made of glass, ceramic, metal, nylon, cotton or a different polymer. The functional group 78 is used to attract mineral particles 72. A diagram of the surface portion 403 and the attached molecules 73 is shown in FIG. 9*a*.

In a different embodiment of the present invention, the surface portion 403' can be made of a polymer having a plurality of molecules 79 that render the surface portion 403' (and thus the collection areas 23, 123 and 223 of FIGS. 4, 5, 6) hydrophobic. The molecules 79 may comprise siloxane functional groups. As with the hydrophobic fiber 401' as shown in FIGS. 8*b* and 8*c*, the polymer can be a hydrophobic material such as polystyrene, poly(d,l-lactide), poly(dimethylsiloxane), polypropylene, polyacrylic, polyethylene, etc. The polymer can also be a hydrophobically-modified polymer, such as hydrophobically-modified ethyl hydroxyethyl cellulose. Alternatively, the surface portion 403' can be made of glass, ceramic, metal, nylon, cotton or other fabric materials and coated with hydrophobic molecules, such as polysiloxanes, alkylsilane and fluoroalkylsilane. The molecules 79 cause the surface portion 403' to become hydrophobic. As such, a hydrophobically-modified mineral particle 72' is attracted to the hydrophobic surface portion 403'. A diagram showing the attraction between the molecular segments 76 and the hydrophobic surface portion 403' is shown in FIG. 9*b*. It should be understood that the particles 72' may be non-mineral and can be some harmful particles in a body of water. Furthermore, the hydrophobic surface portion 403' can also be used to attract non-mineral particles. For example, if a non-mineral particle 71' has one or more hydrophobic chains or molecular segments 76, the non-mineral particle 71' is also attracted to the hydrophobic surface portion 403'. A diagram showing the attraction between the non-mineral particles 71' and the hydrophobic surface portion 403' is shown in FIG. 9*c*. Thus, a filter, impeller or conveyor belt (similar to those shown in FIGS. 4-6) that has hydrophobic surface portions 403' can also be used for water-pollution control, water purification, etc. to rid of hydrophobically-modified particles 72' which may not be a mineral of interest, but some metal harmful to the environment.

The treatment of plain surface 706 (FIG. 7*f*) can be made similar to the surface portions 403, 403' as shown in FIGS. 9*a*-9*c*. That is, the plain surface 706 can be functionalized to provide a functional group 78 as shown in FIG. 9*a*. The plain surface 706 can also be functionalized to be hydrophobic, as shown in FIGS. 9*b* and 9*c*.

It should be understood that, when the collection area 23 of the impeller 20 (FIG. 4), the collection area 123 of the conveyor belt 120 (FIG. 5) and the collection area 223 of the filter 220 (FIG. 6) are functionalized to be hydrophobic, the pulp slurry 11 (FIG. 1*a*), the pulp slurry 101 (FIG. 2) and the pulp slurry 201 (FIG. 3) must be mixed with collector molecules such as xanthates so that the mineral particles 71 (FIGS. 8*b* and 9*b*) in the slurry may be hydrophobically modified with the collector molecules 73 to become wetted mineral particles 72'.

Figure 10B:
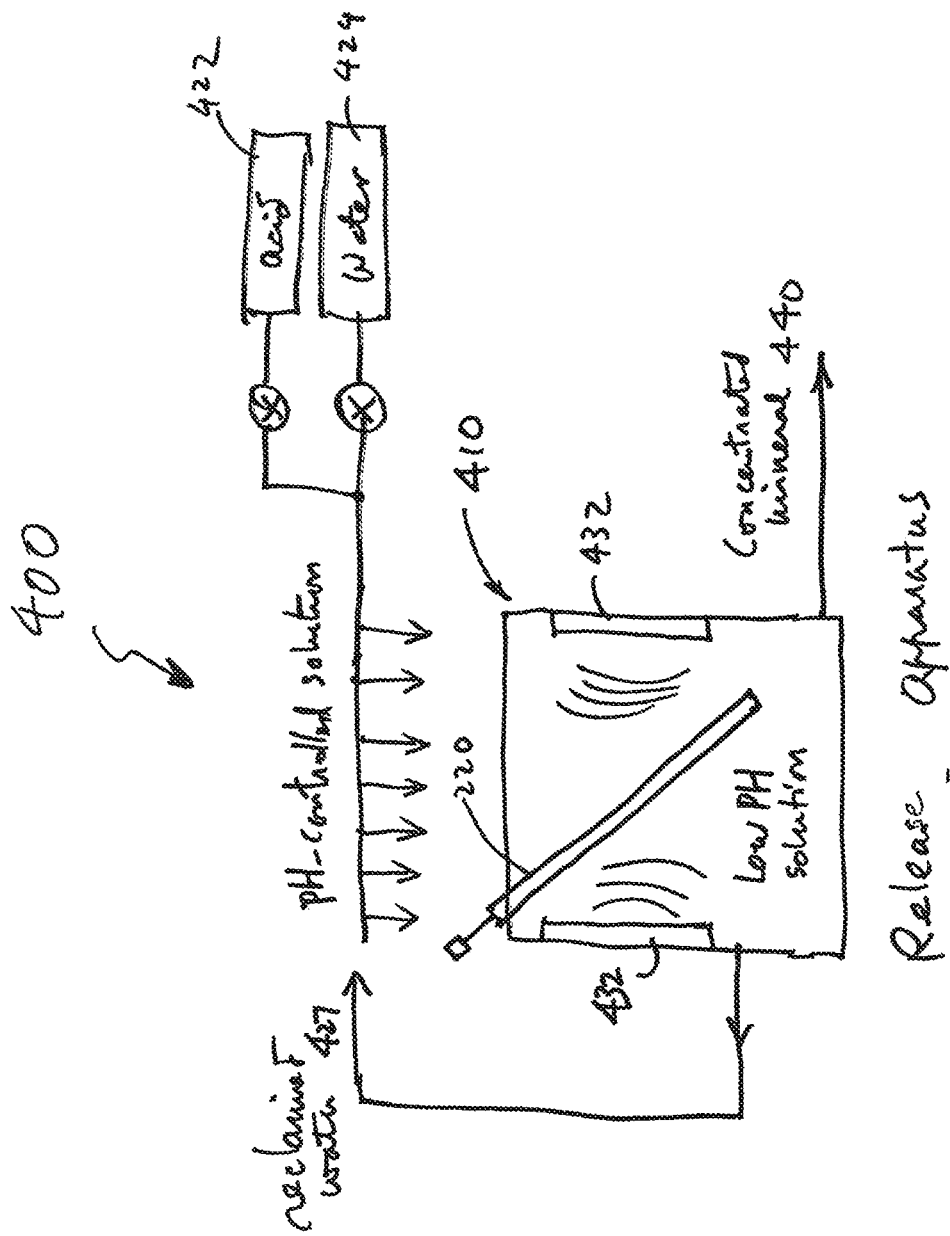
FIG. 10b illustrates a release apparatus configured to release mineral particles from a filter, according to some embodiments of the present invention.

In a different embodiment of the present invention, the impeller 20 (FIG. 1*a*), the conveyor belt 120 (FIG. 2) and the filter 220 (FIG. 3) are used in a horizontal pipeline for mineral separation. Furthermore, a group of filters 220 can be used in a first processor 202 as shown in FIG. 3. By way of example, a plurality of filters 220 are placed into a horizontal pipeline 300 to collect the valuable material in the slurry 322, as shown in FIG. 10a. As the slurry passes through the filters 220, some of the mineral particles in the slurry will become attached to collection area 223 and the openings (see FIGS. 7a-7e). With such an arrangement, one or more of the filters 220 can be taken out of the horizontal pipeline 300 for mineral releasing (see FIG. 10b) while other filters 220 continue to collect the mineral particles. The tailings 342 can be discharged or transported to a tailings pond or the like (see FIG. 11). The attached mineral particles on the filter 220 can be released in a release rich environment with a low pH solution and/or ultrasonic agitation. The pH value of the low pH solution can be 0 to 7, for example. As shown in FIG. 10b, the filter 220 with collected mineral particles can be placed in a releasing apparatus 410 to be washed with a mixture of acid and water provided by water container 424 and acid container 422. One or more ultrasonic sources 432 may be used to shake loose the attached mineral particles from the filter 220. In one embodiment of the present invention, the filter 200 comprises a panel, such as a glass panel, a ceramic panel, a metal sheet, a plastic sheet, wherein the panel is coated with a synthetic material comprising a plurality of molecules configured to attract the mineral particles. The surface of the panel can be a plain surface as shown in FIG. 7f. The reclaimed water 427 can be channeled back for reuse. The concentrated mineral 440 can be taken out of the releasing apparatus 410.

In many releasing environments, the pH value is lower than the pH value for mineral attachment. It should be noted that, however, when the valuable material is copper, for example, it is possible to provide a lower pH environment for the attachment of mineral particles and to provide a higher pH environment for the releasing of the mineral particles from the synthetic beads or bubbles. In general, the pH value is chosen to facilitate the strongest attachment, and a different pH value is chosen to facilitate release. Thus, according to some embodiments of the present invention, one pH value is chosen for mineral attachment, and a different pH value is chosen for mineral releasing. The different pH could be higher or lower, depending on the specific mineral and collector.

Applications

The scope of the invention is described in relation to mineral separation, including the separation of copper from ore.

By way of example, applications are envisioned to include

Rougher/scavenger separation cells in the production stream, replacing the traditional flotation machines.

Tailings scavenger cells are used to scavenge the unrecovered minerals from a tailings stream.

Tailings cleaning cell is used to clean unwanted material from the tailings stream before it is sent to the disposal pond.

Tailings reclamation machine that is placed in the tailings pond to recover valuable mineral that has been sent to the tailings pond.

It should be understood that, the filter 220 (FIGS. 3, 6) can also be used for mineral recovery in a tailings point. By way of example, one or more filters 220 may be placed in a tailings pond 350 to collect the mineral particles in the tailings 342. In order to increase the contact between the collection area 223 and the tailings 342 in the pond 350, it is possible to move the filters 220 back and forth as indicated by arrows A and B. It is understood that when the collection area 223 of the filter 220 is functionalized to be hydrophobic, collector molecules such as xanthates should be added into the tailings 342 so that the mineral particles in the tailings can be wetted. It should be understood that the synthetic beads and filters according to the present invention, whether functionalized to have a collector or functionalized to be hydrophobic, are also configured for use in oilsands separation—to separate bitumen from sand and water in the recovery of bitumen in an oilsands mining operation.

Other types or kinds of valuable material or minerals of interest, include gold, molybdenum, etc.

However, the scope of the invention is intended to include other types or kinds of applications either now known or later developed in the future.

FIGS. 12a-14b: Different Embodiments

On the collection areas 23, 123, 223 of the impeller 20, conveyor belt 120 and filter 220 as shown in FIGS. 4-7f, the collection surfaces on the surface structures are coated with a synthetic material having particular molecules to attract mineral particles. In different embodiments of the present invention, the synthetic material can be used to provide those particular molecules on beads or bubbles, or to make the beads or bubbles (see FIGS. 13a-14b). The bubbles or beads that have the particular molecules to attract mineral particles are herein referred to as synthetic bubbles or beads. By way of example, the synthetic beads or bubbles 170 are used in an impeller or a filter to collect mineral particles 72, 72' (see FIGS. 8a-9b, 13a-14b). As shown in FIG. 12a, the impeller uses a cage or the like to contain a plurality of synthetic beads to provide the collection surfaces in the collection area 23. As shown in FIG. 12b, the filter uses a cage or the like to contain a plurality of synthetic beads 170 to provide the collection surfaces in the collection area 223. When the synthetic beads or bubbles 170 are used to collect valuable material in a tailings pond 350 (FIG. 11), they can be put in a sack 320 as shown in FIG. 12c. As with the synthetic material that is used on the collection surfaces 403, 403' (FIGS. 9a-9c), the synthetic material to be used on the synthetic beads or bubbles 170 may have the functional groups 78 to attract the mineral particles 72, or may have the hydrophobic molecules 79 comprising a siloxane functional group.

Figure 13B:
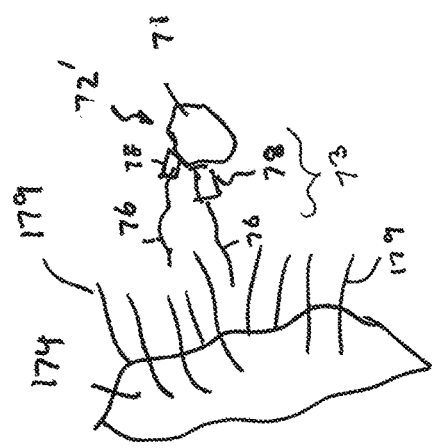
FIG. 13b is an enlarged surface portion of the synthetic bead functionalized to attract wetted mineral particles, according to some embodiments of the present invention.
Figure 13C:
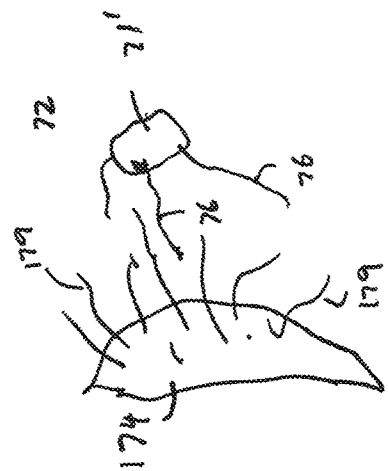
FIG. 13c is an enlarged surface portion of the synthetic bead functionalized to attract non-mineral hydrophobic particles, according to some embodiments of the present invention.
Figure 13A:
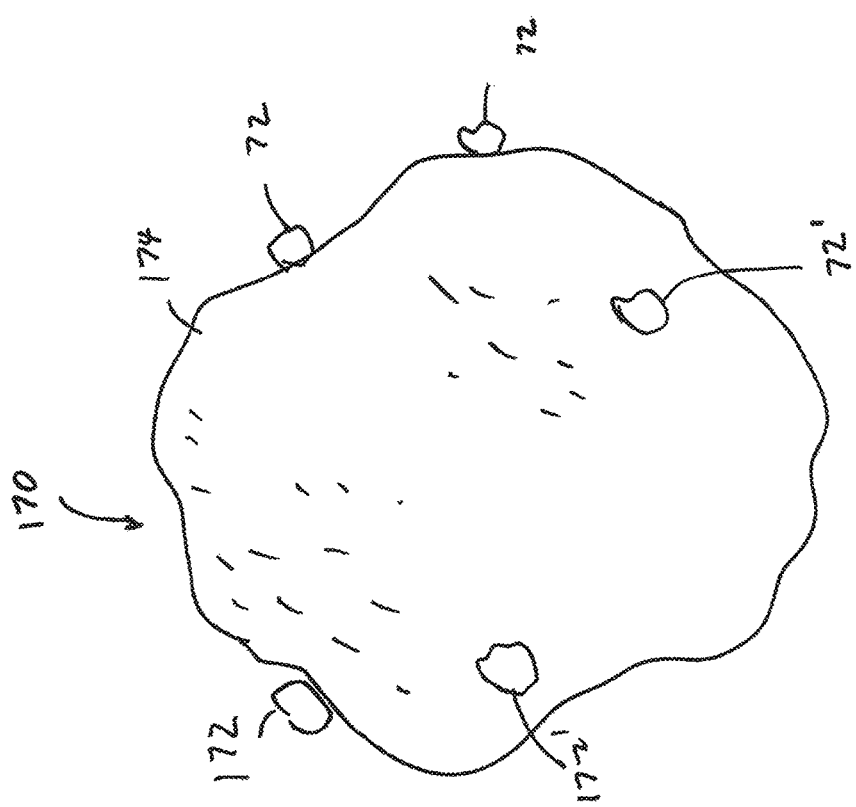
FIG. 13a illustrates a synthetic bead functionalized to attract hydrophobic particles, according to some embodiments of the present invention.

FIG. 13a illustrates a synthetic bead functionalized to attract hydrophobic particles. As shown in FIG. 13a, the synthetic bubble or bead 170 has a solid-phase bead body to provide a bead surface 174. At least the outside part of the bead body is made of a synthetic material, such as a hydrophobic polymer, or a coating of a hydrophobic chemical. As shown in FIGS. 13a and 13b, the surface 174 of the synthetic bubble or bead comprises a plurality of molecules 79 which renders the surface 174 hydrophobic. Molecules 79 may comprise a siloxane functional group. For example, the surface 174 may be a glass surface coated with polysiloxanes which can bind to the hydroxyl group of the glass surface. Polysiloxanes, such as hydroxyl-terminated polydimethysiloxanes, have a silicon-oxygen chain to provide the hydrophobic molecules 79. The hydrophobic particle 72', as shown in FIG. 13b, can be a mineral particle 71 having one or more collectors 73 attached thereto. One end (78) of the collector 73 has an ionizing bond attached to the mineral particle 71. The other end of the collector 73 has a hydrophobic chain 76 which tends to move into the hydrophobic molecules 79. Thus, the hydrophobic particle 72' can be a wetted mineral particle. A collector, such as xanthate, has both the functional group 78 and the molecule 76. The hydrophobic particle 72, as shown in FIG. 13c, can be a particle 71' that has a hydrophobic chain 76. Such particle can be non-mineral related, but it can be arranged to contact with the hydrophobic synthetic bubbles or beads 170 of the present inventions. Likewise, the particle 71 may be non-mineral and can be harmful to the environment. Thus the hydrophobic bubbles or beads 170, according to the present invention, can be used in non-mining applications, such as water-pollution control and water purification. The size of the synthetic bead can be smaller than the minimum size of the mineral particles which is about 150 μm, and can be larger than the maximum size of the mineral particles. In certain applications, the size of the synthetic bead can be 1 cm or larger.

Figure 14B:
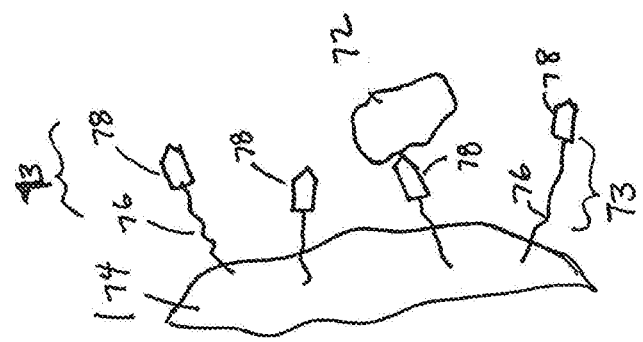
FIG. 14b is an enlarged surface portion of the synthetic bead functionalized to attract mineral particles, according to some embodiments of the present invention.
Figure 14A:
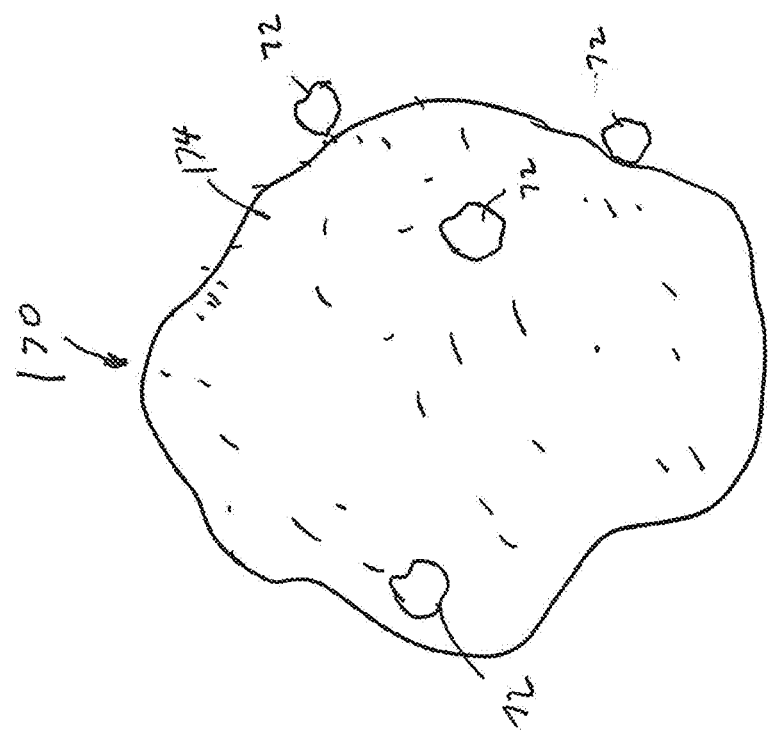
FIG. 14a illustrates a synthetic bead having a functional group to attract mineral particles according to some embodiments of the present invention.

FIG. 14a illustrates a synthetic bead having a functional group to attract mineral particles. The synthetic bead 170 has a bead body to provide a bead surface 174 to attract mineral particles 72. FIG. 14b is an enlarged surface of the synthetic bead functionalized to attract mineral particles. At least the outside part of the bead body is made of a synthetic material, such as polymer, so as to provide a plurality of molecules or molecular segments 76 on the surface 174. The molecule 76 is used to attach a chemical functional group 78 to the surface 174. In general, the molecule 76 can be a hydrocarbon chain, for example, and the functional group 78 can have an anionic bond for attracting a mineral, such as copper to the surface 174. A xanthate, for example, has both the functional group 78 and the molecular segment 76 to be incorporated into the polymer that is used to make the synthetic bead 70. The functional group 78 is also known as a collector that can have a non-ionizing or ionizing bond to attract the mineral particles 72. Similarly, a chelating agent can be incorporated into the polymer as a collector site for attracting a mineral, such as copper.

The releasing of the mineral particles from the synthetic beads can be similar to the releasing of the mineral particles from the impeller, conveyor belt or the filter. For example, after the synthetic beads 170 in the collection area 23 or 223 or in the sack 320 (FIGS. 12a-12c) have collected a certain amount of mineral particles, the synthetic beads 170 can be made contact with a low pH solution and/or subjected to ultrasonic agitation (e.g., FIG. 10b) in order to release the mineral particles. However, a high pH solution can also be used for releasing certain mineral particles while a low pH environment is used for mineral attachment.

According to some embodiments of the present invention, only a portion of the surface of the synthetic bead is functionalized to be hydrophobic. This has the benefits as follows:

1. Keeps too many beads from clumping together—or limits the clumping of beads,
2. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

According to some embodiments of the present invention, only a portion of the surface of the synthetic bead is functionalized with collectors. This also has the benefits of 1. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

Figure 15A:
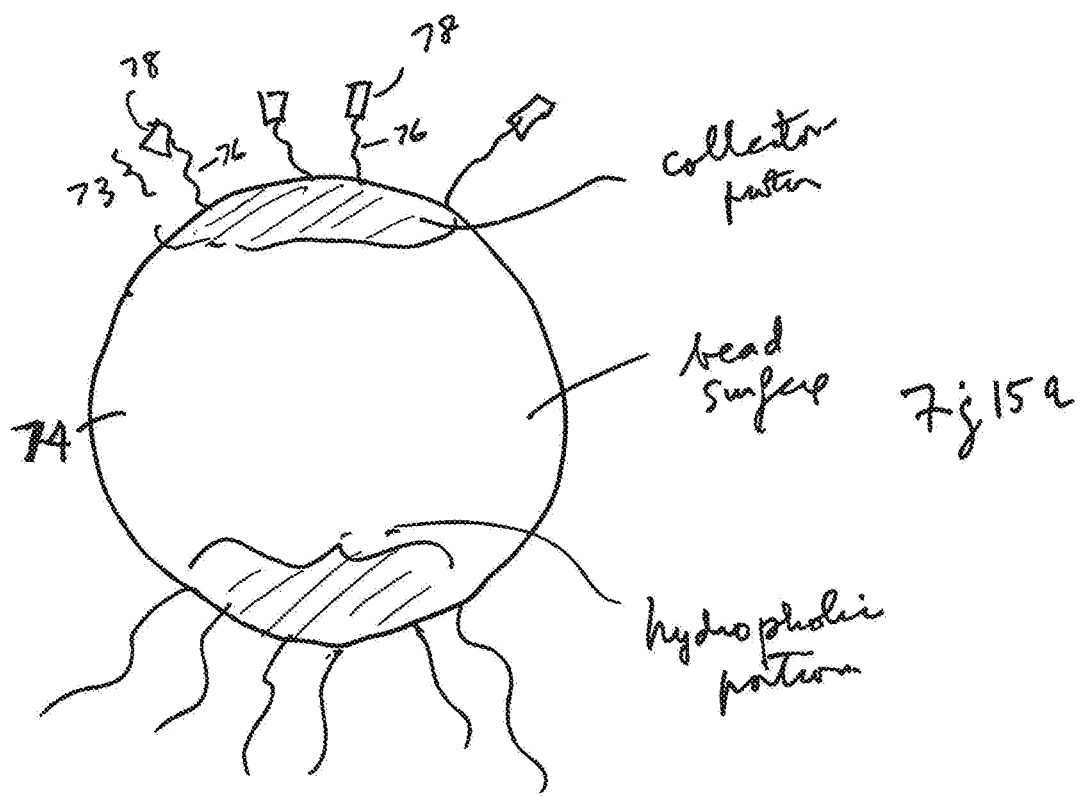
FIGS. 15a and 15b illustrate some embodiments of the present invention wherein the synthetic bead or bubble have one portion functionalized to have collector molecules and another portion functionalized to be hydrophobic, according to some embodiments of the present invention.
Figure 15B:
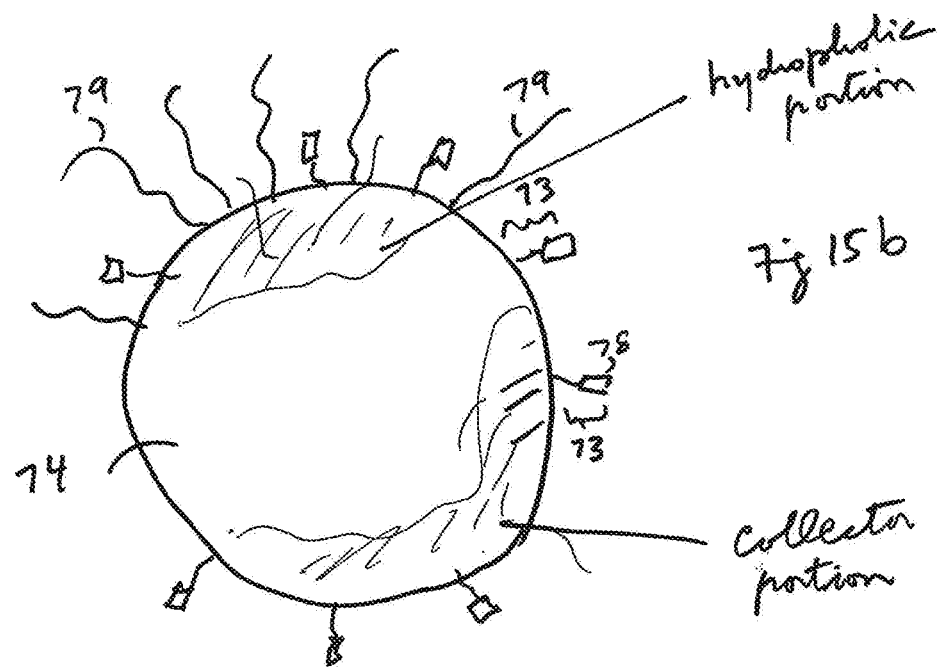

According to some embodiments of the present invention, one part of the synthetic bead is functionalized with collectors while another part of same synthetic bead is functionalized to be hydrophobic as shown in FIGS. 15a and 15b. As shown in FIG. 15a, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 79. In the embodiment as shown in FIG. 15b, the entire surface of the synthetic bead 74 can be functionalized to have collector molecules 73, but a portion of the surface is functionalized to have hydrophobic molecules 79 render it hydrophobic. Molecules 79 may comprise a siloxane functional group.

This "hybrid" synthetic bead can collect mineral particles that are wetted and not wetted.

According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

Figure 16A:
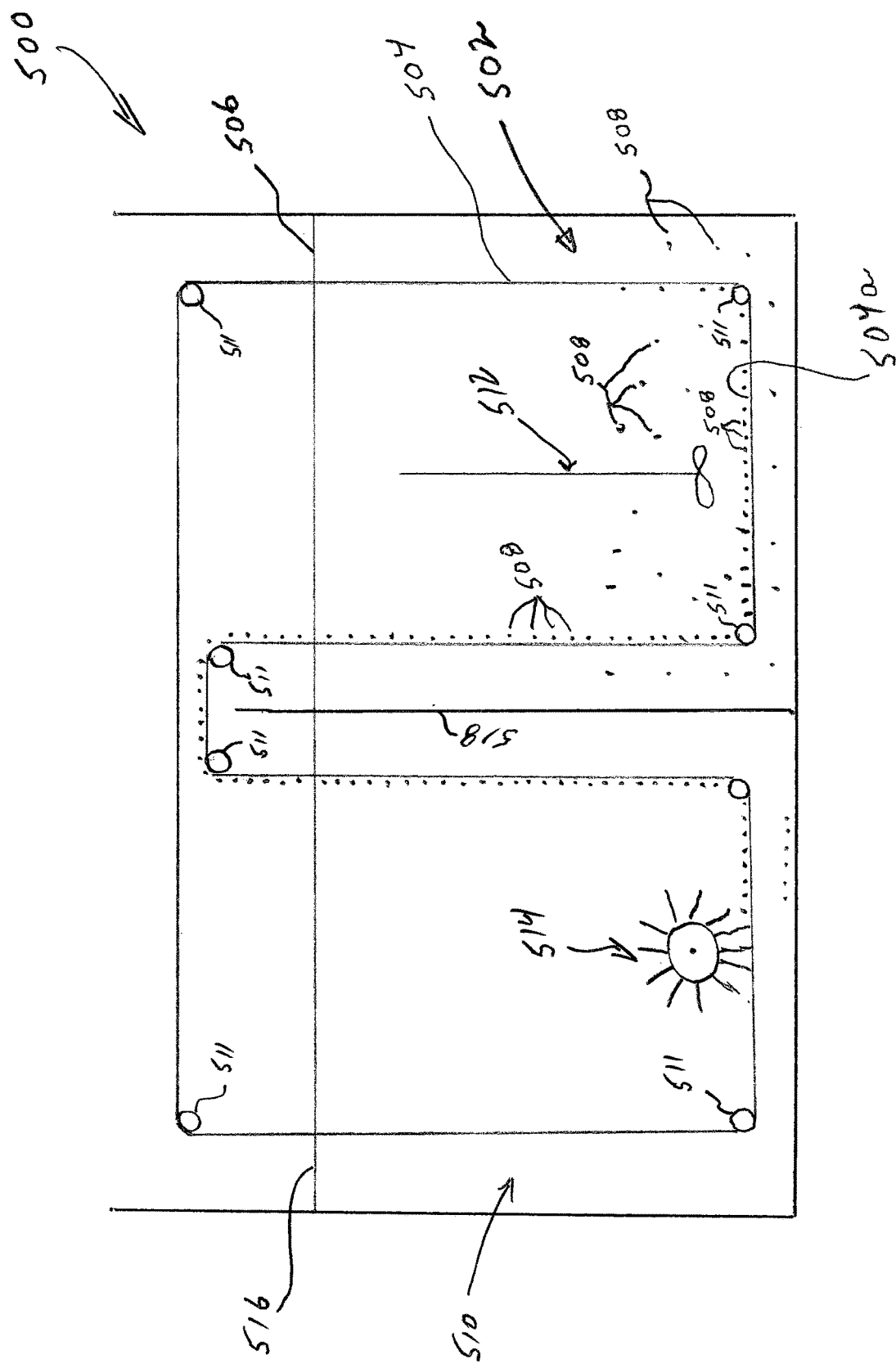
FIG. 16a shows a diagram of apparatus having a conveyor belt made of polyurethane and coated with a silicone gel for collecting value material of a wide range of sizes, including the particles far larger than about 500 microns, according to some embodiments of the present invention.
Figure 17A:
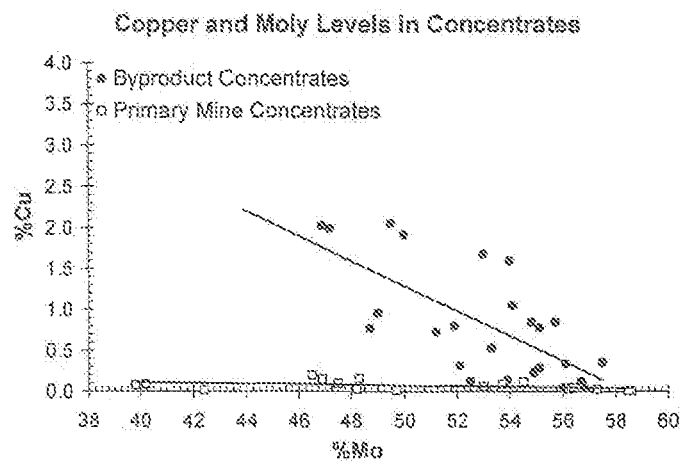
FIG. 17 is a graph of copper and moly levels in concentrates showing the % CU versus % Mo, where the solid dots show the concentrations by byproduct concentrations and the black squares show the concentrations by primary mine concentrations.

FIGS. 16a, 16b

FIG. 16a shows the present invention in the form of an apparatus generally indicated as 500 including a collection area or tank 502 having one or more collection surfaces 504 configured to contact with a mixture 506 having water and valuable material, the valuable material having a plurality of mineral particles 508 of interest; and a synthetic material 504a provided at least on the collection surfaces as shown in FIG. 16b, the synthetic material 504a having plurality of molecules with a siloxane functional group configured to attract the mineral particles 508 of interest to the collection surfaces 504.

In FIG. 16, the one or more collection surfaces 504 may form part of a conveyor belt also indicated as 504, as shown, that is driven through the collection area or tank 502, through a release area or tank 510, back through the collection area or tank 502, etc. As shown, the conveyor belt 504 is arranged on various pulleys 511 that may be driven by one or more motors (not shown) and configured with corresponding linkage (also not shown). Conveyor belts and conveyor belt systems are known in the art, and the scope of the invention is not intended to be limited to any particular type or kind thereof either now known or later developed in the future.

According to some embodiments of the present invention, the mixture 506 may include, or take the form of, a pulp slurry having ground ore with mineral particles of interest forming part thereof, including mineral particles of interest of about 500 microns or larger. According to some embodiments of the present invention, the mixture 506 may include chemistry configured to enhance the attraction and/or attachment between the synthetic material having the siloxane functional group and the mineral particles 508 of interest in the mixture 506. By way of example, the mixture 506 may include a hydrophobizing agent and/or polymeric collector, e.g., including polyethylenimine (PEI), although the scope of the invention is intended to include other types or kinds of hydrophobizing agents and/or polymeric collectors within the spirit of the present invention. By way of further example, embodiments are envisioned in which the mixture 506 may include Xanthate or Xanthate salt, which is otherwise known in the art to be used as a flotation and/or hydrophobic agent in mineral processing. The chemistry set forth herein is intended to include chemistry or chemistries that are both now known or later developed in the future.

According to some embodiments of the present invention, the collection area or tank 502 may be configured with one or more stirrers, mixers or agitators 512 for stirring, mixing or agitating the mixture 506. The release area or tank 510 may be configured with one or more broom-like devices 514 for sweeping and/or releasing in whole or in part attached mineral particles 508 of interest from the synthetic material 504a of the collection surfaces 504. Embodiments are envisioned in which the broom-like device 514 is configured on either or both sides of the conveyor belt 504. According to some embodiments of the present invention, the release area or tank 510 may have a corresponding mixture 516 configured to enhance the releasing in whole or in part of the attached mineral particles 508 of interest from the synthetic material 504a of the collection surfaces 504. As shown, the collection area or tank 502 and the release area or tank 510 are separated by a wall 518.

By way of example, the conveyor belt 504 may be made of polyurethane rubber indicated as 504b in FIG. 16b and coated with a silicone gel indicated as 504a for collecting the valuable material of interest of a wide range of sizes, including particles far larger than about 500 microns. After being coated on the polyurethane rubber 504b, the silicone gel 504a will cure and harden to as to form part of, and stick to, the polyurethane rubber 504b. Embodiments are envisioned in which the polyurethane rubber 504b may be coated on either or both sides with the silicone gel 504a. The scope of the invention is intended to include, and embodiments are envisioned in which, the conveyor belt 504 may be made of some other elastic material either now known or later developed in the future. The silicone gel 504a may include, or take the form of, molecules having the siloxane functional group, e.g., including a siloxane that is, or may take the form of, a functional group in organosilicon chemistry with the Si—O—Si linkage. By way of example, parent siloxanes may include, or take the form of, oligomeric and polymeric hydrides with the formulae $H(OSiH_2)_nOH$ and $(OSiH_2)_n$. The scope of the invention is also intended to include other types or kinds of siloxanes either now known or later developed in the future, e.g., including branched compounds, where the defining feature includes each pair of silicon centers being separated by one oxygen atom. In one embodiment of the present invention, and set forth by way of example, the silicone gel 504a took the form of a product from Dow-Corning® Corporation, Midland, Mich. 48686-0994, USA, e.g., labeled as product no. 2986922-1104 (Lot: 0007137499), that is sold in a combination that includes 3-4222 Dielectric Firm Gel Part A and 3-4222 Dielectric Firm Gel Part B. By way of example, the gel may come with two parts:

Part A includes dimethyl siloxane, dimethylvinyl-terminated—68083-19-2; polydimethylsiloxane—63148-62-9; reaction of ethylene glycol and silica—170424-65-4; hydrotreated light naphthenic petroleum distillate—64742-53-6.

Part B includes dimethyl siloxane, dimethylvinyl-terminated—68083-19-2; polydimethylsiloxane—63148-62-9; dimethyl siloxane, hydrogen-terminated—none; trimethylated silica—68909-20-6; dimethyl, methylhydrogen siloxane—68037-59-2.

The scope of the invention is intended to include, and embodiments are envisioned in which, the one or more collection surfaces 504 may be configured or made substantially of a material that consists of a siloxane-based material in a non-gel form.

PDMS

By way of example, PDMS is understood to be characterized by a chemical formula:

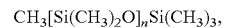

$CH_3[Si(CH_3)_2O]_nSi(CH_3)_3,$ where n is the number of repeating monomer $[SiO(CH_3)_2]$ units.

PDMS includes oxygen, hydrogen, silicon and carbon. Because of the presence of oxygen, PDMS is normally considered or classified as being part of a polar group. In chemistry, polarity is generally understood to refer to a separation of electric charge leading to a molecule or its chemical groups having an electric dipole or multipole moment, and a polar molecule is generally understood to have a polarity that is characterized as being asymmetric.

Alternatives to Conveyor Belt Embodiments

The scope of the invention is not intended to be limited to the collection surface 504 including, or taking the form of, a conveyor belt. For example, embodiments are envisioned in which the collection surface 504 includes, or takes the form of, one or more of an impeller, a filter assembly and/or a flat plate, as well as other types or kinds of collection surfaces either now known or later developed in the future, consistent with that set forth herein.

The Related Family

This application is related to a family of applications, including at least the following:

This application is related to a family of nine PCT applications, which were all concurrently filed on 25 May 2012, as follows:

PCT application no. PCT/US12/39528, entitled "Flotation separation using lightweight synthetic bubbles and beads;"

PCT application no. PCT/US12/39524, entitled "Mineral separation using functionalized polymer membranes;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest;"

PCT application no. PCT/US12/39591, entitled "Method and system for releasing mineral from synthetic bubbles and beads;"

PCT application no. PCT/US12/39596, entitled "Synthetic bubbles and beads having hydrophobic surface;"

PCT application no. PCT/US12/39631, entitled "Mineral separation using functionalized filters and membranes;

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column,"

all of which are incorporated by reference in their entirety.

This application also related to PCT application no. PCT/US13/28303, filed 28 Feb. 2013, entitled "Method and system for flotation separation in a magnetically controllable and steerable foam," which is also hereby incorporated by reference in its entirety.

This application also related to PCT application no. PCT/US13/42202, filed 22 May 2013, entitled "Charged engineered polymer beads/bubbles functionalized with molecules for attracting and attaching to mineral particles of interest for flotation separation," which is also hereby incorporated by reference in its entirety.

This application also related to PCT application no. PCT/US14/37823, filed 13 May 2014, entitled "Polymer surfaces having siloxane functional group," which claims benefit to U.S. patent application Ser. No. 14/890,477, filed 11 Nov. 2014, which is also hereby incorporated by reference in its entirety.

This application also related to PCT application no. PCT/US13/73855, filed 9 Dec. 2013, entitled "Techniques for agglomerating mature fine tailing by injecting a polymer in a process flow," which is also hereby incorporated by reference in its entirety.

This application also related to PCT application no. PCT/US15/33485, filed 1 Jun. 2015, entitled "Mineral recovery using hydrophobic polymer surfaces," which is also hereby incorporated by reference in its entirety.

This application also related to PCT application no. PCT/US15/66390, filed 17 Dec. 2015, entitled "Transportable modular system for enhanced mineral recovery from tailings lines and deposits," which is also hereby incorporated by reference in its entirety.

THE SCOPE OF THE INVENTION

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow).

Although the invention has been described and illustrated with respect to exemplary embodiments thereof, the foregoing and various other additions and omissions may be made therein and thereto without departing from the spirit and scope of the present invention.

What is claimed is:

1. A copper/molybdenum separation processor comprising:
  a slurry/media mixture stage configured to receive a conditioned pulp containing hydrophobic molybdenite and hydrophilic copper, iron and other minerals that is conditioned with sodium hydrosulfide together with an engineered polymeric hydrophobic media loaded with hydrophobic molybdenite, and provide a slurry/media mixture; and
  a slurry/media separation stage configured to receive the slurry/media mixture, and provide a slurry product having a copper concentrate and a polymerized hydrophobic media product having a molybdenum concentrate that are separately directed for further processing, wherein the slurry/media separation stage comprises a media recovery stage configured to direct the slurry product having the copper concentrate to a copper concentrate filtration stage and the polymerized hydrophobic media product to a media wash stage, the copper concentrate filtration stage having filters configured to provide the copper concentrate, and wherein the copper concentrate comprises the hydrophilic copper, and the polymerized hydrophobic media product comprises the engineered polymeric hydrophobic media loaded with hydrophobic molybdenite.

2. A copper/molybdenum separation processor according to claim 1, wherein the slurry/media mixture stage comprises a molybdenite loading stage configured to contact the conditioned pulp with the engineered polymeric hydrophobic media and load the hydrophobic molybdenite on the engineered polymeric hydrophobic media.

3. A copper/molybdenum separation processor according to claim 1, wherein the media recovery stage having a vibrating screen, or a rotating trommel, configured to filter, separate and direct the slurry product having the copper concentrate to the copper concentrate filtration stage and the polymerized hydrophobic media product to the media wash stage.

4. A copper/molybdenum separation processor according to claim 3, wherein the copper/molybdenum separation processor comprises the media wash stage having a vibrating screen or trommel equipped with wash water sprays, configured to clean the polymerized hydrophobic media product, eliminate entrainment of hydrophilic particles, and provide washed engineered polymeric hydrophobic media.

5. A copper/molybdenum separation processor according to claim 4, wherein the media wash stage is configured to advance the washed polymerized hydrophobic media to a media stripping stage, and return a wash solution, containing any residual hydrophilic particles, to a Cu/Mo thickening stage that forms part of the slurry/media mixture stage.

6. A copper/molybdenum separation processor according to claim 4, wherein the copper/molybdenum separation processor comprises a media stripping stage configured to receive the washed engineered polymeric hydrophobic media, remove loaded hydrophobic minerals from the washed engineered polymeric hydrophobic media using a strip solution or surfactant, and provide washed and stripped engineered polymeric hydrophobic media.

7. A copper/molybdenum separation processor according to claim 6, wherein the copper/molybdenum separation processor comprises a media recovery stage having a screen or trommel, configured to
  receive the washed and stripped engineered polymeric hydrophobic media in the form of a slurried mixture of stripped media, recovered hydrophobic particles and residual strip solution,
  recycle recovered, washed and stripped polymeric hydrophobic media to a molybdenite loading stage that forms part of the slurry/media mixture stage, filter and direct residual slurry having the molybdenum concentrate to a moly filtration stage; and
  recycle recovered stripping solution to the stripping stage.

8. A copper/molybdenum separation processor according to claim 7, wherein the copper/molybdenum separation processor comprises the moly filtration stage configured to receive the molybdenum concentrate and provide filtered molybdenum concentrate.

9. A copper/molybdenum separation processor according to claim 3, wherein the copper/molybdenum separation processor comprises the copper concentrate filtration stage configured to receive the slurry product and provide a filtered slurry product having a filtered copper concentrate.

10. A copper/molybdenum separation processor according to claim 1, wherein the conditioned pulp is formed in part from a pulp that is thickened by a copper/molybdenite concentrate thickening stage configured upstream copper/molybdenum separation processor.

11. A copper/molybdenum separation processor according to claim 1, wherein the slurry/media mixture stage comprises a molybdenite loading stage configured to contact the conditioned pulp with the engineered polymeric hydrophobic media, including in an agitated reaction chamber, load the hydrophobic molybdenite on the engineered polymeric hydrophobic media, direct the slurry product to a copper concentrate filtration stage and direct remaining load engineered polymeric hydrophobic media in the slurry/media mixture to a media wash stage.

12. A copper/molybdenum separation processor according to claim 11, wherein the copper/molybdenum separation processor comprises the media wash stage, including a wash stage vibrating screen or trommel equipped with wash water sprays, configured to clean the remaining loaded engineered polymeric hydrophobic media, eliminate entrainment of hydrophilic particles, and provide washed engineered polymeric hydrophobic media.

13. A copper/molybdenum separation processor according to claim 12, wherein the media wash stage is configured to advance the washed engineered polymeric hydrophobic media to a media stripping stage, and return a wash solution, containing any residual hydrophilic particles, to a Cu/Mo thickening stage that forms part of the slurry/media mixture stage.

14. A copper/molybdenum separation processor according to claim 13, wherein the copper/molybdenum separation processor comprises a media stripping stage configured to receive the washed engineered polymeric hydrophobic media, remove loaded hydrophobic minerals from the washed engineered polymeric hydrophobic media using a strip solution or surfactant, and provide washed and stripped engineered polymeric hydrophobic media.

15. A copper/molybdenum separation processor according to claim 14, wherein the copper/molybdenum separation processor comprises a media recovery stage, including a screen or trommel, configured to
 receive the washed and stripped engineered polymeric hydrophobic media in the form of a slurried mixture of stripped media, recovered hydrophobic particles and residual strip solution,
 recycle recovered, washed and stripped engineered polymeric hydrophobic media to the molybdenum loading stage,
 filter and direct residual slurry having the molybdenum concentrate to the moly filtration stage; and
 recycle recovered stripping solution to the stripping stage.

16. A copper/molybdenum separation processor according to claim 15, wherein the copper/molybdenum separation processor comprises the moly filtration stage configured to receive the molybdenum concentrate and provide filtered molybdenum concentrate.

17. A copper/molybdenum separation processor according to claim 11, wherein the copper/molybdenum separation processor comprises the copper concentrate filtration stage configured to receive the slurry product and provide a filtered slurry product having a filtered copper concentrate.

18. A copper/molybdenum separation processor according to claim 11, wherein the conditioned pulp is formed in part from a pulp that is thickened by a copper/molybdenite concentrate thickening stage configured upstream copper/molybdenum separation processor.

19. A copper/molybdenum separation processor according to claim 1, wherein the engineered polymeric hydrophobic media comprises polymeric engineered beads made of a synthetic material having a plurality of molecules with a siloxane functional group configured to attract the hydrophobic molybdenite in the conditioned pulp.

20. A copper/molybdenum separation processor according to claim 19, wherein the synthetic material has a coating with the plurality of molecules with the siloxane functional group configured to attract the hydrophobic molybdenite in the conditioned pulp.

21. A copper/molybdenum separation processor according to claim 20, wherein the coating comprises a silicone gel having the siloxane functional group.

22. A copper/molybdenum separation processor according to claim 20, wherein the coating comprises polydimethylsiloxane.

23. A copper/molybdenum separation processor according to claim 20, wherein the coating comprises a silicone polymer.

24. A copper/molybdenum separation processor according to claim 21, wherein the silicone gel comes with two parts, wherein one part contains
 dimethyl siloxane, dimethylvinyl-terminated; polydimethylsiloxane; reaction of ethylene glycol and silica; hydrotreated light naphthenic petroleum distillate; and another part contains dimethyl siloxane, dimethylvinyl-terminated; polydimethylsiloxane; dimethyl siloxane, hydrogen-terminated; trimethylated silica; dimethyl, methylhydrogen siloxane.

25. A copper/molybdenum separation processor according to claim 20, wherein the coating is configured or made substantially of a material that consists of a siloxane-based material in a non-gel form.

26. A copper/molybdenum separation processor according to claim 20, wherein the coating is functionalized to be hydrophobic so as to provide a bonding between the coating and the mineral particle of interest.

27. A copper/molybdenum separation processor according to claim 1, wherein the engineered polymeric hydrophobic media comprises polymeric engineered beads/bubbles having surfaces made of a polymer and coated with a silicone gel to provide the siloxane functional group.

28. A copper/molybdenum separation processor according to claim 27, wherein the polymer is naturally hydrophobic or functionalized to be hydrophobic.

29. A copper/molybdenum separation processor according to claim 27, wherein the polymer is a hydrophobic polymer, including a polydimethylsiloxane.

30. A copper/molybdenum separation processor according to claim 27, wherein the surfaces are rendered hydrophobic by having chemicals with a siloxane functional group.

31. A copper/molybdenum separation processor according to claim 20, wherein the coating is coated with hydrophobic silicone polymer including polysiloxane so as to become hydrophobic.

32. A copper/molybdenum separation processor according to claim 20, wherein the coating comprises polymer surfaces and the synthetic material comprise a siloxane derivative.

33. A copper/molybdenum separation processor according to claim 20, wherein the synthetic material comprises polysiloxanes.

34. A copper/molybdenum separation processor according to claim 20, wherein the synthetic material comprises one or more of dimethyl siloxane, dimethylvinyl-terminated; polydimethylsiloxane; and dimethyl, methylhydrogen siloxane.

35. A copper/molybdenum separation processor according to claim 20, wherein the synthetic material comprises hydroxyl-terminated polydimethylsiloxanes.

36. A copper/molybdenum separation processor according to claim 32, wherein the polymer surfaces comprise polyurethane.

37. A copper/molybdenum separation processor according to claim 20, wherein the coating comprises a polymer selected from a group consisting of polyamides, polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane.

38. A copper/molybdenum separation processor according to claim 20, wherein the coating comprises a polymer from a group consisting of polystyrene, poly(d,l-lactide), poly(dimethylsiloxane), polypropylene, polyacrylic, polyethylene, hydrophobically-modified ethyl hydroxyethyl cellulose polysiloxanes, alkylsilane and fluoroalkylsilane.

39. A copper/molybdenum separation processor according to claim 2, wherein the agitated reaction chamber includes, or takes the form of, a tumbler-style reaction chamber, as well as a mechanical, rotating/tumbling, gravity flow, chemical, pneumatic, centrifugal reaction chamber.

\* \* \* \* \*